(12) United States Patent
Yoshimura et al.

(10) Patent No.: US 10,771,202 B2
(45) Date of Patent: Sep. 8, 2020

(54) TRANSMISSION APPARATUS, RECEPTION APPARATUS, COMMUNICATION METHOD, AND INTEGRATED CIRCUIT

(71) Applicants: Sharp Kabushiki Kaisha, Sakai, Osaka (JP); FG Innovation Company Limited, New Territories (HK)

(72) Inventors: Tomoki Yoshimura, Sakai (JP); Shoichi Suzuki, Sakai (JP); Tatsushi Aiba, Sakai (JP); Liqing Liu, Sakai (JP); Wataru Ouchi, Sakai (JP); Takashi Hayashi, Sakai (JP); Kimihiko Imamura, Sakai (JP)

(73) Assignees: Sharp Kabushiki Kaisha, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/317,584

(22) PCT Filed: Jul. 18, 2017

(86) PCT No.: PCT/JP2017/025886
§ 371 (c)(1),
(2) Date: Jan. 14, 2019

(87) PCT Pub. No.: WO2018/012637
PCT Pub. Date: Jan. 18, 2018

(65) Prior Publication Data
US 2019/0229860 A1 Jul. 25, 2019

(30) Foreign Application Priority Data
Jul. 15, 2016 (JP) .................................. 2016-140062

(51) Int. Cl.
*H04L 5/00* (2006.01)
*H04L 1/00* (2006.01)
*H04L 27/26* (2006.01)

(52) U.S. Cl.
CPC .............. *H04L 5/0007* (2013.01); *H04L 1/00* (2013.01); *H04L 1/0071* (2013.01);
(Continued)

(58) Field of Classification Search
CPC ......... H04L 1/00; H04L 27/26; H04L 5/0007; H04L 5/0042; H04L 1/0071; H04L 27/2647
See application file for complete search history.

(56) References Cited

U.S. PATENT DOCUMENTS

2008/0098273 A1* 4/2008 Blankenship ......... H03M 13/05
714/746
2009/0070653 A1* 3/2009 Kim ...................... H04L 1/0061
714/758

(Continued)

FOREIGN PATENT DOCUMENTS

EP   3 484 055 A1   5/2019
EP   3 484 113 A1   5/2019

(Continued)

OTHER PUBLICATIONS

Official Communication issued in International Patent Application No. PCT/JP2017/025886, dated Oct. 17, 2017.

(Continued)

*Primary Examiner* — Syed Haider
(74) *Attorney, Agent, or Firm* — Keating & Bennett, LLP

(57) ABSTRACT

A terminal apparatus includes a coding unit configured to divide a transport block into one or more code blocks and generate coded bit(s) by coding the one or more code blocks; and a transmitter configured to transmit the coded bit(s) by (Continued)

Coding and Rate matching using a channel, wherein multiplex bit(s) are given based on at least coupling of the coded bit(s) generated by coding of the one or more code blocks, the coding unit maps the multiplex bit(s) to a matrix in a first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

12 Claims, 11 Drawing Sheets

(52) U.S. Cl.
CPC ............ *H04L 5/0042* (2013.01); *H04L 27/26* (2013.01); *H04L 27/2647* (2013.01)

(56) References Cited

U.S. PATENT DOCUMENTS

| | | | |
|---|---|---|---|
| 2009/0100300 A1 | 4/2009 | Kim et al. | |
| 2011/0138258 A1* | 6/2011 | Okamura | H03M 13/6356 714/780 |
| 2014/0341050 A1 | 11/2014 | Luo et al. | |
| 2015/0082113 A1* | 3/2015 | Myung | H03M 13/1165 714/752 |
| 2017/0187489 A1* | 6/2017 | Myung | H03M 13/1102 |
| 2017/0324428 A1 | 11/2017 | Li et al. | |
| 2019/0013901 A1* | 1/2019 | Nimbalker | H04L 1/0057 |

FOREIGN PATENT DOCUMENTS

| | | |
|---|---|---|
| JP | 2010-541460 A | 12/2010 |
| WO | 2014/036196 A2 | 3/2014 |
| WO | 2015/184914 A1 | 12/2015 |

OTHER PUBLICATIONS

Ntt Docomo, "New SID Proposal: Study on New Radio Access Technology", 3GPP TSG RAN Meeting #71, RP-160671, Mar. 7-10, 2016, 8 pages.

"3rd Generation Partnership Project; Technical Specification Group Radio Access Network; Study on New Radio (NR) Access Technology Physical Layer Aspects (Release 15)", 3GPP TR 38.802 V0.0.3, Mar. 2016, pp. 1-19.

Panasonic, "Channel interleaver for UL OFDM", 3GPP TSG RAN WG1 Meeting #55bis, R1-090258, Jan. 12-16,2009, pp. 1-3.

Huawei, et al.; "Analysis on the reduction of peak rate"; 3GPP TSG RAN WG1 Meeting #74; R1-132877; Aug. 19th-23rd, 2013; 3 pages.

LTE; Evolved Universal Terrestrial Radio Access (E-UTRA); Multiplexing and channel coding (3GPP TS 36.212 version 8.8.0 Release 8); ETSI TS 136 212; V 8.8.0; Jan. 2010; 62 pages.

* cited by examiner

TRANSMISSION APPARATUS, RECEPTION APPARATUS, COMMUNICATION METHOD, AND INTEGRATED CIRCUIT

TECHNICAL FIELD

The present invention relates to a transmission apparatus, a reception apparatus, a communication method, and an integrated circuit.

This application claims priority based on Japanese Patent Application No. 2016-140062 filed on Jul. 15, 2016, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered. In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

In 3GPP, a next generation standard (New Radio: NR) has been studied for proposition to International Mobile Telecommunication (IMT)-2020 which is a standard of a next generation mobile communication system which has been planned by International Telecommunication Union (ITU) (NPL 1). NR is desired to satisfy demands assuming three scenarios, enhanced Mobile BroadBand (eMBB), massive Machine Type Communication (mMTC), Ultra Reliable and Low Latency Communication (URLLC), in the framework of a single technique.

To satisfy such demands, error correcting codes employed in NR have been studied (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.
NPL 2: "3GPP TR 38.802 V0.0.3 (2016-03)", R1-165889, 9 Jun. 2016.

SUMMARY OF INVENTION

Technical Problem

One aspect of the present invention provides a transmission apparatus which can efficiently perform error correction coding, a communication method used for the transmission apparatus, an integrated circuit configured to be mounted in the transmission apparatus, a reception apparatus which can efficiently perform error correction decoding, a communication method used for the reception apparatus, and an integrated circuit configured to be mounted in the reception apparatus.

Solution to Problem (1) According to some aspects of the present invention, the following measures are provided. Specifically, a first aspect of the present invention is a terminal apparatus including: a coding unit configured to divide a transport block into one or more code blocks and generate coded bit(s) by coding the one or more code blocks; and a transmitter configured to transmit the coded bit(s) by using a channel, wherein multiplex bit(s) are given based on at least coupling of the coded bit(s) generated by coding of the one or more code blocks, the coding unit maps the multiplex bit(s) to a matrix in a first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(2) A second aspect of the present invention is a terminal apparatus including: a coding unit configured to divide a transport block into one or more code blocks and generate coded bit(s) by coding the one or more code blocks; and a transmitter configured to map transmission symbol(s) to a prescribed channel and transmit the channel, wherein the transmission symbol(s) are given based on at least modulation of a sequence in which the coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(3) A third aspect of the present invention is a base station apparatus including: a receiver configured to receive a channel; and a decoding unit configured to decode one or more code blocks transmitted using the channel, wherein multiplex bit(s) are given based on at least coupling of coded bit(s) generated by coding of the one or more code blocks, the decoding unit maps the multiplex bit(s) to a matrix in the first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(4) A fourth aspect of the present invention is a base station apparatus including: a receiver configured to receive a channel including transmission symbol(s); and a decoding unit configured to decode one or more code blocks transmitted using the channel, wherein the transmission symbol (s) are given based on at least modulation of a sequence in which coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(5) A fifth aspect of the present invention is a communication method used by a terminal apparatus, the communication method including the steps of: dividing a transport block into one or more code blocks and generating coded bit(s) by coding the one or more code blocks; and transmitting the coded bit(s) by using a channel, wherein multiplex bit(s) are given based on at least coupling of the coded bit(s) generated by coding of the one or more code blocks, in the step of generating the coded bit(s), the multiplex bit(s) are mapped to a matrix in a first-axis prioritized manner and the multiplex bit(s) are read from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(6) A sixth aspect of the present invention is a communication method used by a terminal apparatus, the communication method including the steps of: dividing a transport block into one or more code blocks and generating coded bit(s) by coding the one or more code blocks; and mapping transmission symbol(s) to a prescribed channel and transmitting the channel, wherein the transmission symbol(s) are given based on at least modulation of a sequence in which the coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(7) A seventh aspect of the present invention is a communication method used by a base station apparatus, the communication method including the steps of: receiving a channel; and decoding one or more code blocks transmitted using the channel, wherein a multiplex bit(s) are given based on at least coupling of coded bit(s) generated by coding of the one or more code blocks, in the step of decoding the one or more code blocks, the multiplex bit(s) are mapped to a matrix in the first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(8) An eight aspect of the present invention is a communication method used by a base station apparatus, the communication method including the steps of: receiving a channel including transmission symbol(s); and decoding one or more code blocks transmitted using the channel, wherein the transmission symbol(s) are given based on at least modulation of a sequence in which coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

Advantageous Effects of Invention

According to one aspect of the present invention, the transmission apparatus can efficiently perform the error correction coding. Furthermore, the reception apparatus can efficiently perform the error correction decoding.

DESCRIPTION OF EMBODIMENTS

Embodiments of the present invention will be described below. In the following description, the term "given" may be rephrased as "determined" or "set".

Figure 1:
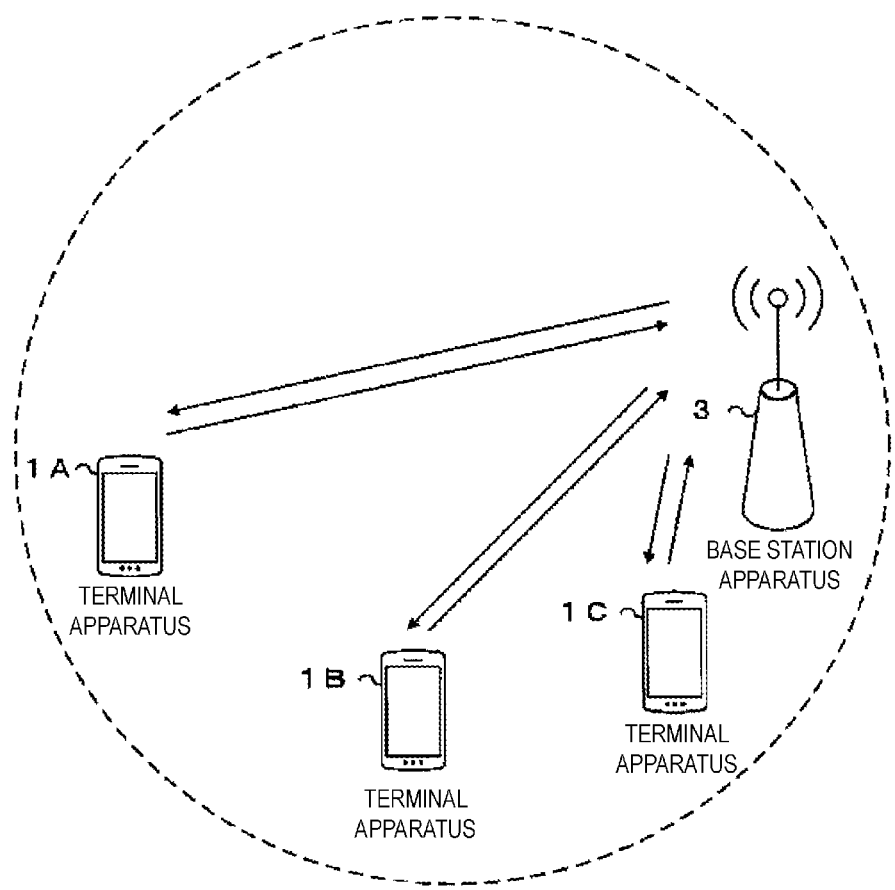
FIG. 1 is a conceptual diagram of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, each of the terminal apparatuses 1A to 1C is also referred to as a terminal apparatus 1.

Hereinafter, carrier aggregation will be described.

In one aspect of the present invention, multiple serving cells may be configured for the terminal apparatus 1. A technology in which the terminal apparatus 1 communicates via the multiple serving cells is referred to as cell aggregation or carrier aggregation. One aspect of the present invention may be applied to each of the multiple serving cells configured for the terminal apparatus 1. Furthermore, one aspect of the present invention may be applied to some of the multiple serving cells configured. Furthermore, one aspect of the present invention may be applied to each of the multiple serving cells configured. Furthermore, one aspect of the present invention may be applied to some of the multiple serving cell groups configured. Here, one serving cell may be configured with a single band. Furthermore, one serving cell may be configured with an aggregation of multiple noncontinuous bands.

The multiple serving cells may include at least one primary cell. Here, the multiple serving cells may include at least one of multiple secondary cells. A primary cell may be a serving cell on which initial connection establishment procedure has been performed. Furthermore, a primary cell may be a serving cell on which connection re-establishment procedure has been started. Furthermore, a primary cell may be a cell which is instructed as a primary cell in a handover procedure. For cells other than the primary cell, the secondary cell may be configured at a point of time when or after a Radio Resource Control (RRC) connectivity is established. Here, the primary cell may be a cell complying with LTE standard. Furthermore, the primary cell may be a cell complying with NR standard.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission and/or reception on multiple physical channels in multiple serving cells (component carriers). Transmission of one physical channel may be performed in one serving cell (component carrier) of the multiple serving cells (component carriers).

The terminal apparatus 1 can specify the serving cell in accordance with an index relating to the serving cell (e.g., ServCellIndex, SCellIndex and the like). The index relating to the serving cell may be included in a higher layer signal transmitted by the base station apparatus.

Dual connectivity is described below.

Figure 2:
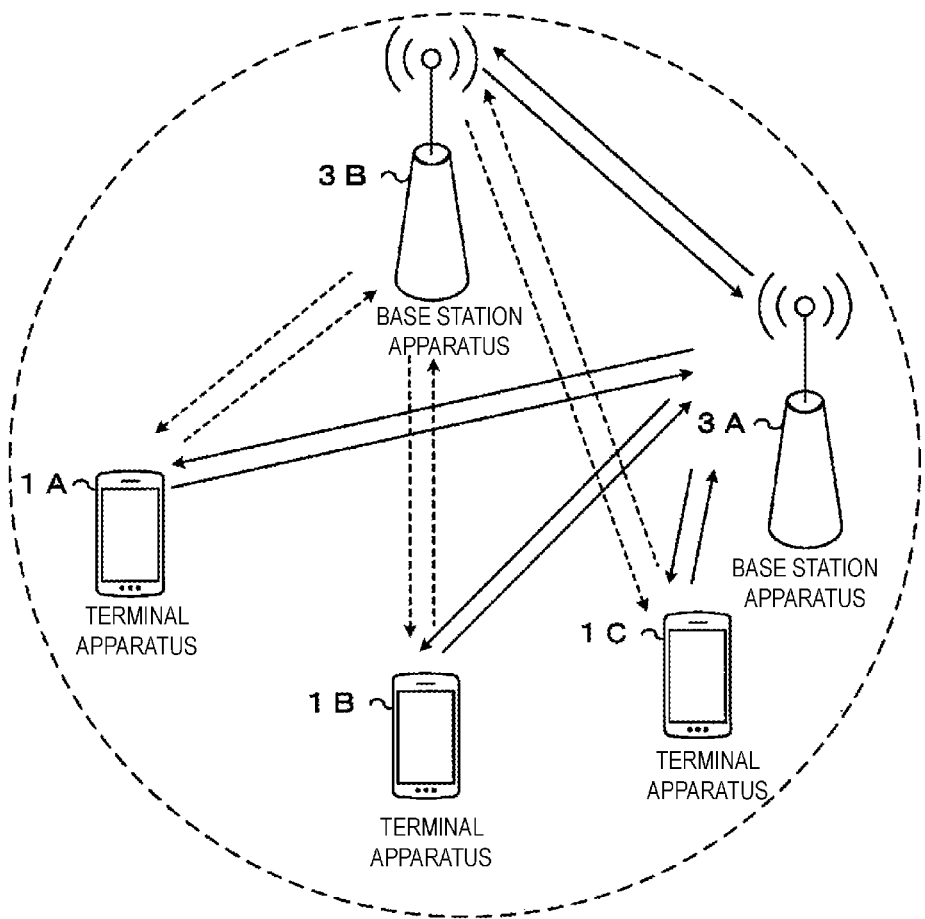
FIG. 2 is a conceptual diagram of the radio communication system according to the present embodiment.

FIG. 2 is a diagram illustrating an example of the radio communication system according to the present embodiment. The following describes a case that the terminal apparatus 1 is connected with multiple base station apparatuses 3A and 3B (the base station apparatus 3A and 3B are also collectively referred to as a base station apparatus 3) at the same time. It is assumed that the base station apparatus 3A is a master base station apparatus (MeNB: Master eNB), and the base station apparatus 3B is a secondary base station apparatus (SeNB: Secondary eNB). The terminal apparatus 1 connecting to the base station apparatuses 3 at the same time by using the multiple cells belonging to the multiple base station apparatuses 3 as described above is referred to as "dual connectivity". The cells belonging to the respective base station apparatuses 3 may be operated at the same frequency or different frequencies.

Note that the carrier aggregation is different from the dual connectivity in that a single one of the base station apparatuses 3 manages multiple cells and the frequencies of the respective cells are different from each other. In other words, Carrier Aggregation is a technique for connecting the single terminal apparatus 1 and a single one of the base station apparatus 3 via multiple cells having different frequencies, while dual connectivity is a technique for connecting the single terminal apparatus 1 and the multiple base station apparatuses 3 via multiple cells having the same frequency or different frequencies.

From another viewpoint, the dual connectivity may be establishment of an RRC connectivity at least two network points by the terminal apparatus 1. In the dual connectivity, the terminal apparatus 1 may be connected via a non-ideal backhaul in RRC connected (RRC_CONNECTED) state.

A group of serving cells associated with a master base station apparatus may be referred to as a Master Cell Group (MCG). Furthermore, a group of serving cells associated with a secondary base station apparatus may be referred to as a Secondary Cell Group (SCG). Note that the cell groups may be serving cell groups.

In dual connectivity, the primary cell may belong to the MCG. Moreover, in the SCG, the secondary cell corresponding to the primary cell is referred to as "Primary Secondary Cell" (pSCell). Note that the pSCell may be referred to as "special cell" or "Special Secondary Cell" (Special SCell).

In one aspect of the present invention, serving cells complying with the LTE standard and serving cells complying with the NR standard may be connected by the dual connectivity. For example, the MCG may include a serving cell at least complying with the LTE standard, and the SCG may include a serving cell at least complying with the NR standard.

An example of a configuration of a radio frame according to the present embodiment is described below.

Figure 3:
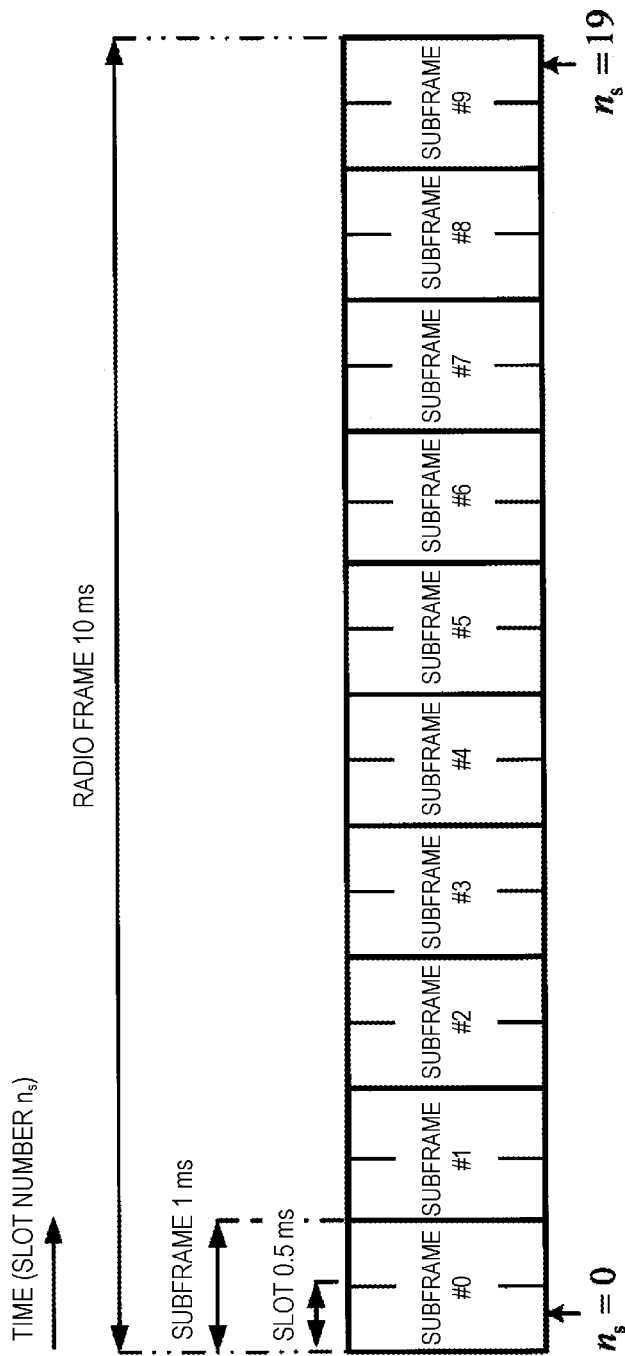
FIG. 3 is a diagram including an example of a schematic configuration of a radio frame according to the present embodiment.

FIG. 3 illustrates an example of a schematic configuration of a radio frame of the present embodiment. For example, each radio frame may be 10 ms in length. In FIG. 3, the horizontal axis represents a time axis. Furthermore, for example, each radio frame may be constituted of 10 subframes. Each subframe may be 1 ms in length, and may be defined by two successive slots. Each slot may be 0.5 ms in length. In other words, 10 subframes may be included in each 10 ms interval. Here, a subframe is also referred to as a Transmission Time Interval (TTI). The TTI may be specified by the numbers of Orthogonal Frequency Division Multiplexing (OFDM) symbols.

Figure 4:
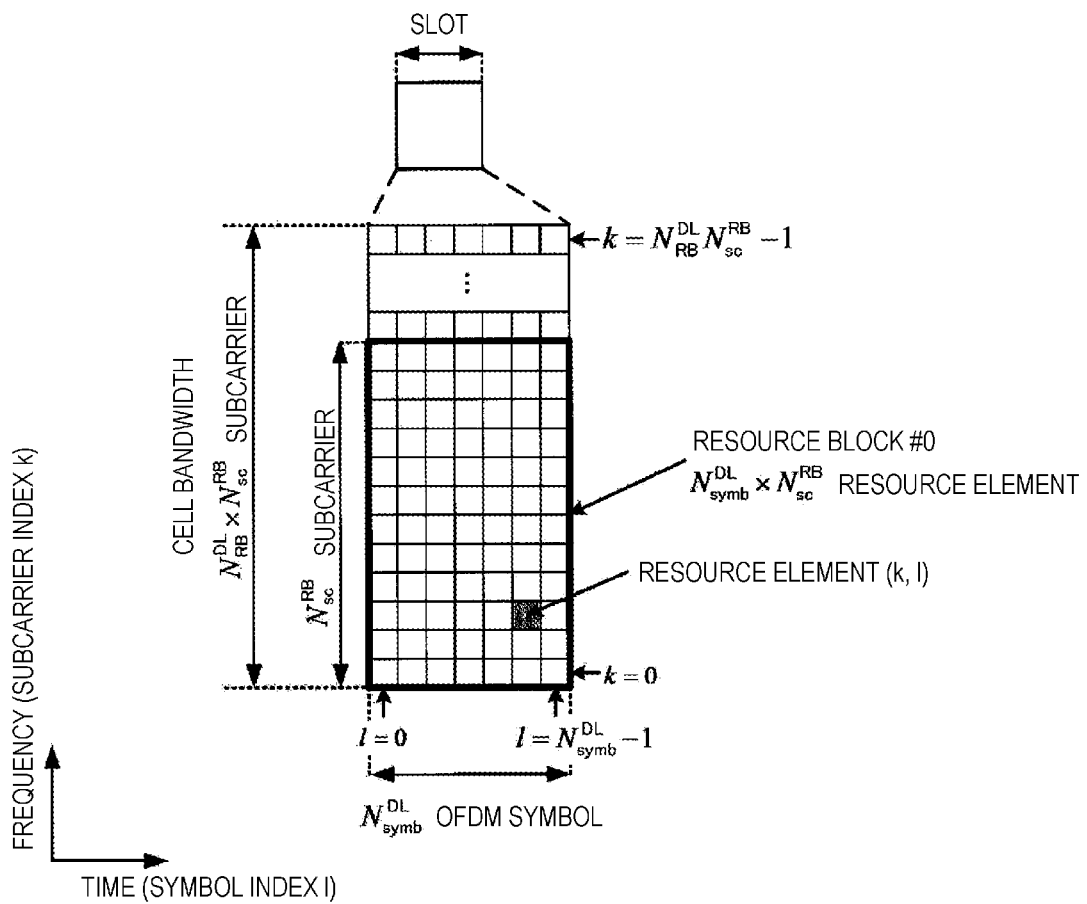
FIG. 4 is a diagram illustrating an example of a schematic configuration of a slot according to the present embodiment.

An example configuration of a slot according to the present embodiment will be described below. FIG. 4 illustrates an example of a schematic configuration of a slot in the present embodiment. FIG. 4 illustrates an example of a slot configuration in one cell. In FIG. 4, the horizontal axis represents a time axis, and the vertical axis represents a frequency axis. In FIG. 4, 1 is an OFDM symbol number/index, and k is a subcarrier number/index. Note that the OFDM symbol is also referred to simply as a symbol. Furthermore, also in a case that a cell has a signal waveform (which includes a signal waveform based on the OFDM) other than the OFDM, one symbol to which the signal waveform is applied may be referred to as an OFDM symbol.

In one aspect of the present invention, the physical signal or the physical channel transmitted in each of the slots may be expressed by a resource grid. In the downlink, the resource grid may be defined with multiple subcarriers and multiple OFDM symbols. Each element within the resource grid is referred to as a resource element. The resource element is expressed by a subcarrier number/index k and an OFDM symbol number/index 1.

In one aspect of the present invention, the slot may include multiple OFDM symbols 1 (1=0, 1, . . . , $N^{DL}_{symb}$) in the time domain. For example, $N^{DL}_{symb}$ may indicate the number of OFDM symbols included in one uplink slot. For a normal Cyclic Prefix (CP), $N^{DL}_{symb}$ may be 7. For an extended CP, $N^{DL}_{symb}$ may be 6.

In one aspect of the present invention, the slot may include multiple subcarriers k (k=0, 1, . . . , $N^{DL}_{RB} \times N^{RB}_{sc}$) in the frequency domain. $N^{DL}_{RB}$ may be a bandwidth configuration for the serving cell expressed by a multiple of $N^{RB}_{sc}$. $N^{RB}_{sc}$ may be a (physical) resource block size expressed by the number of subcarriers (subcarrier number) in the frequency domain. Subcarrier interval Df may be 15 kHz, and $N^{RB}_{sc}$ may be 12. In other words, the bandwidth occupied by one resource block may be 180 kHz. Subcarrier interval Df may be different for each channel, and/or for each TTI.

An example of a method of initial connectivity is described below.

The terminal apparatus 1 may perform an operation of detecting a channel transmitted from the base station apparatus 3 in a case of establishing connectivity (such as initial connectivity, a preliminary preprocess for communication, preparation of communication, preliminary connectivity) with the base station apparatus 3. Preferably, a channel transmitted from the base station apparatus 3 can be detected even in a condition in which at least one of communication settings (such as bandwidth, cell ID, subcarrier interval, shared channel setting, and control channel setting) of the base station apparatus 3 is unknown to the terminal apparatus 1. For example, a channel transmitted from the base station apparatus 3 may be configured to be repeatedly transmitted at a certain time period. The channel detected for connecting the terminal apparatus 1 with the base station apparatus is also referred to as a synchronization channel (or Synchronization Signal (SS) or the like).

The synchronization channel may have a function of providing channel information (Channel State Information (CSI)) of a radio resource to which the synchronization channel is transmitted to the terminal apparatus 1. In other words, the synchronization channel may be a reference signal for demodulating information (e.g., system information) or the like used for connecting with the base station apparatus 3. For example, the system information may be a Master Information Block (MIB) or a System Information Block (SIB). Furthermore, the synchronization channel may be information (e.g., a Physical Cell ID, a Virtual Cell ID, and ID scrambling system information) used for demodulating system information. In other words, by detection of the synchronization channel, the terminal apparatus 1 may acquire at least one piece of information used for demodulating the channel information and/or system information.

The synchronization channel may be a Primary Synchronization Signal (PSS), and/or a Secondary Synchronization Channel (SSS). By detection of the synchronization channel, the terminal apparatus 1 may acquire the channel information, and/or the physical cell ID. The physical cell ID may be information for specifying the base station apparatus 3.

The physical channels are described below.

The channel transmitted from the base station apparatus 3 may include a synchronization channel, a reference signal channel, a broadcast channel, a control channel, and a shared channel. The synchronization channel may be transmitted for synchronization of the terminal apparatus 1 with the base station apparatus 3 in frequency and/or time. The reference signal channel may be transmitted for acquiring the channel information for demodulating the channel. The broadcast channel may be a channel including information applied to multiple terminal apparatuses 3 connected with the base station apparatus 3. The control channel may be a channel including information applied to the terminal apparatus 1 (or a group of the terminal apparatuses 1). The shared channel may be a channel including information applied to the terminal apparatus 1 (or a group of the terminal apparatuses 1).

For example, the synchronization channel may be any of the PSS and the SSS. From another view point, the PSS and the SSS may be a reference signal channel for demodulating a broadcast channel. The synchronization channel may have a function of notifying of identification information relating to a serving cell such as the physical cell ID, the virtual cell ID and the like.

For example, the reference signal channel may be any one of a Cell specific Reference signal (CRS), a DeModuration Reference signal (DMRS), a UE specific-Reference signal (UE-RS), a Channel State Information-Reference signal (CSI-RS), and a Discovery Reference signal (DRS).

For example, the broadcast channel may be a Physical Broadcast CHannel (PBCH). The broadcast channel may be a channel including Primary information (MIB) for communication of the base station apparatus 3 and the terminal apparatus 1.

For example, the control channel may be any of a Physical Downlink Control CHannel (PDCCH) and an Enhanced Physical Downlink Control CHannel (EPDCCH). The control channel may be a channel including information (e.g., scheduling information and the like) required for demodulation of the shared channel. The control channel may include a set of control information. For example, the set of control information may be Downlink Control Information (DCI).

For example, the shared channel may include a Physical Downlink Shared CHannel (PDSCH), a Physical Uplink Shared CHannel (PUSCH), a Physical Sidelink Shared Channel (PSSCH), and a Physical Shared Channel (PSCH). The shared channel may be a channel including a higher layer signal. For example, the higher layer signal may be information included in a MAC Control Element (MCE). Furthermore, for example, the higher layer signal may be information included in a Radio Resource Configuration (RRC) signaling.

The channel transmitted from the base station apparatus 3 and/or the channel transmitted from the terminal apparatus 1 may be included in one Transmission Time Interval (TTI). For example, the TTI length may or may not be 1 ms. The TTI length may be equal to the length of the slot. Furthermore, the TTI length may be defined by a constant multiple of symbols (OFDM symbols, or Discrete Fourier Transform-spreading OFDM (DFT-s-OFDM) symbols). Furthermore, the TTI length may be given based on a subcarrier interval. Here, the DFT-s-OFDM in the uplink may be a Single Carrier-Frequency Division Multiple Access (SC-FDMA) from a view point of the base station apparatus 3 (or the radio communication system).

The TTI length for the channel including the transport block may be set based on information included in a higher layer signal. The TTI length for the channel including the transport block may be configured based on information included in a control channel. The TTI length for the channel including the transport block may be configured based on information configured in advance in the terminal apparatus 1. Here, the TTI length of the channel including a transport block channel, and the TTI length for the channel including the transport block may be a length for the channel including the transport block in a time domain. The phrase, configured in advance in the terminal apparatus 1, may be included in a storage apparatus (or a storage medium) of the terminal apparatus 1. Furthermore, the phrase, configured in advance in the terminal apparatus 1, may be configured based on a statement in a specification. Furthermore, the phrase, configured in advance, may be configured based on a statement in a specification.

The base station apparatus 3, or a transmission process 3000 included in the terminal apparatus 1 is described below.

Figure 5:
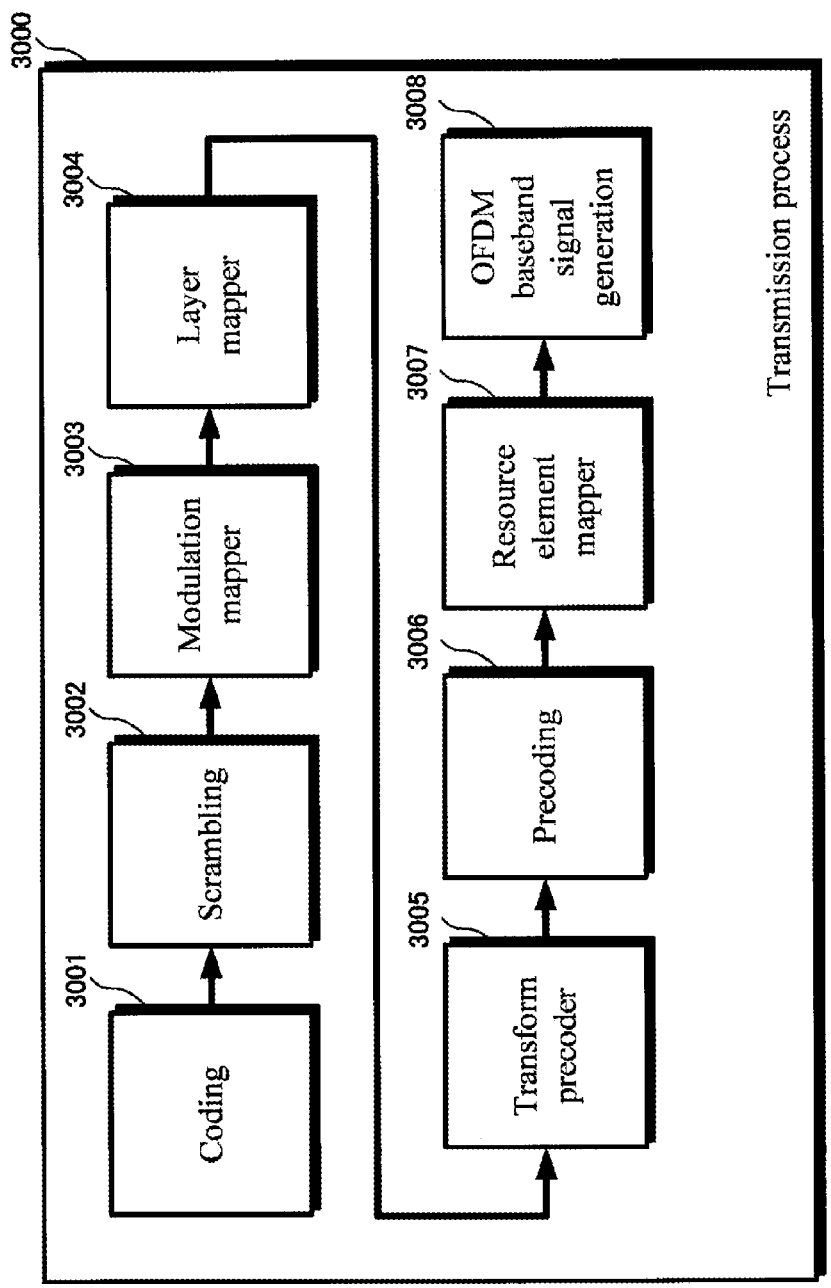
FIG. 5 is a diagram illustrating an example of a configuration of a transmission process 3000 according to the present embodiment.

FIG. 5 illustrates an example of a configuration of the transmission process 3000 of a physical layer. The Transmission process 3000 is a configuration including at least one of a coding processing unit (coding) 3001, a scrambling processing unit (Scrambling) 3002, a modulation mapper processing unit (Modulation mapper) 3003, a layer mapper processing unit (Layer mapper) 3004, a transmission precoder processing unit (Transform precoder) 3005, a precoder processing unit (Precoder) 3006, a resource element mapper processing unit (Resource element mapper) 3007, and a baseband signal generation processing unit (OFDM baseband signal generation processing unit) 3008.

For example, the coding processing unit 3001 may have a function of converting, into coded bit(s), a transport block (or, data block, transport data, transmission data, transmission code, transmission block, payload, information, information block and the like) sent (notified, transmitted, transported, transferred or the like) by the higher layer through an error correction coding process. For example, the error correction coding includes a Turbo code, a Low Density Parity Check (LDPC) code, a Polar code, a convolutional code (or Tail biting convolutional code or the like), a block code, a Reed Muller (RM) code, a reed solomon code, and an iteration code. The coding processing unit 3001 has a function of sending coded bit(s) to the scrambling processing unit 3002. Details of the operation of the coding processing unit 3001 are described below.

Here, the transport block converted to the coded bit(s) may be coded bit(s) on which the error correction coding has been applied. In other words, in one aspect of the present invention, an error correction coding process of an Outer code may be performed on the transport block.

For example, the scrambling processing unit 3002 may have a function of converting coded bit(s) into scramble bit(s) by a scramble process. For example, the scrambled bit(s) may be obtained by addition modulo 2 to the coded bit(s) and the scramble sequences. In other words, the scramble may be addition of modulo 2 to the coded bit(s) and the scramble sequences. The scramble sequence may be a sequence generated by a pseudo-random function, based on a specific sequence (for example a Cell specific-Radio Network Temporary Identifier (C-RNTI)).

For example, the modulation mapper processing unit 3003 may have a function of converting scramble bit(s) into modulation bit(s) by a modulation mapping process. The modulation bit(s) may be obtained by a modulation process such as Quaderature Phase Shift Keying (QPSK), 16 Quaderature Amplitude Modulation (16 QAM), 64 QAM, and 256 QAM on scramble bit(s). Here, the modulation bit(s) are also referred to as modulation symbol(s).

For example, the layer mapper processing unit 3004 may have a function of mapping modulation bit(s) to each layer. The layer is an index relating to the degree of overlay of a physical layer signal in a space region. This means that no spacial multiplexing is performed in a case that the number of the layers is 1, for example. Furthermore, this means that spacial multiplexing of two types of physical layer signals is performed in a case that the number of the layers is 2.

For example, the transmission precoder processing unit 3005 may have a function of generating transmission bit(s) by performing a transmission precode process on the modulation bit(s) mapped to each layer. The modulation bit(s) and the transmission bit(s) may be complex number symbol(s). For example, the transmission precode process includes a process of DFT spread (DFT spreading) and the like. Here, in the transmission precoder processing unit 3005, whether the transmission precode process is performed may be given based on information included in a higher layer signal. In the transmission precoder processing unit 3005, whether the transmission precode process is performed may be given based on information included in a control channel. In the transmission precoder processing unit 3005, whether the transmission precode process is performed may be given based on preliminarily configured information. Here, the transmission bit(s) are also referred to as transmission symbol(s).

For example, the precoder processing unit 3006 may have a function of generating the transmission bit(s) of each transmit antenna port by multiplying transmission bit(s) by a precoder. The transmit antenna port is a logical antenna port. One transmit antenna port may be constituted of multiple physical antennas. The logical antenna port may be identified by the precoder.

For example, the resource element mapper processing unit 3007 may have a function of performing a process of mapping the transmission bit(s) of each transmit antenna port to the resource element. Details of the method of mapping to the resource element in the resource element mapper processing unit 3007 are described below.

For example, the baseband signal generation processing unit 3008 may have a function of converting the transmission bit(s) mapped to the resource element into a baseband signal. The process of converting transmission bit(s) to a baseband signal may include Inverse Fast Fourier Transform (IFFT), Windowing, Filter processing, and the like, for example. In the baseband signal generation processing unit 3008, whether the process of converting the transmission bit(s) mapped to the resource element into a baseband signal is performed may be given based on information included in a higher layer signal. In the baseband signal generation processing unit 3008, whether the process of converting the transmission bit(s) mapped to the resource element into a baseband signal is performed may be given based on information included in a control channel. In the baseband signal generation processing unit 3008, whether the process of converting the transmission bit(s) mapped to the resource element into a baseband signal is performed may be given based on preliminarily configured information. In the transmission process 3000, the higher layer signal and the control channel may be transmitted by one of the terminal apparatus 1 and the base station apparatus 3. In the transmission process 3000, the higher layer signal and the control channel may be received by the other of the terminal apparatus 1 and the base station apparatus 3. In the transmission process 3000, the function information of the terminal apparatus 1 including the transmission process 3000 may be transmitted to the base station apparatus 3 by using the higher layer signal or the control channel. Here, the function information of the terminal apparatus 1 may be information indicating the function of the terminal apparatus 1. The information indicating the function of the terminal apparatus 1 may be information indicating the error correction coding system supported by the terminal apparatus 1, for example. Furthermore, the information indicating the function of the terminal apparatus 1 may be associated with the time required for processing (Processing time) a transport block transmitted from base station apparatus 1. The information indicating the function of the terminal apparatus 1 may be an acceptable minimum value, for the terminal apparatus 1, as a period until a reception acknowledgement for the transport block is expected to be received after the transmission of the transport block from the terminal apparatus 1. The information indicating the function of the terminal apparatus 1 may be an acceptable minimum value, for the terminal apparatus 1, as a period until a reception acknowledgement of the transport block is expected to be transmitted after the reception of the transport block by the terminal apparatus 1.

Now, details of the operation of the coding processing unit 3001 are described.

Figures 6A, 6B:
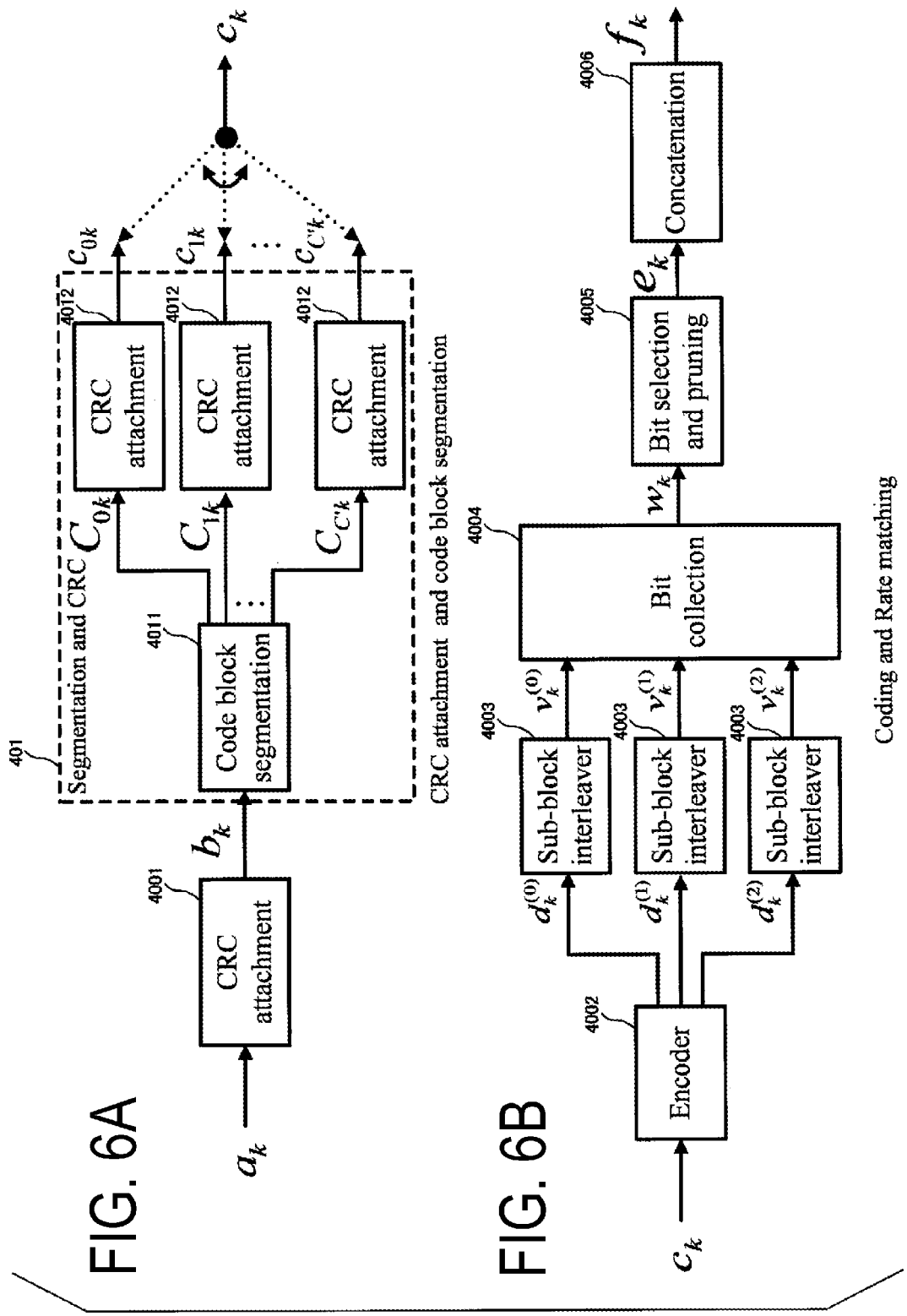
FIGS. 6A and 6B are diagrams illustrating examples of a configuration of a coding processing unit 3001 according to the present embodiment.

FIGS. 6A and 6B are diagrams illustrating examples of a configuration of the coding processing unit 3001 according to the present embodiment. The coding processing unit 3001 includes at least one of an CRC attachment unit (CRC attachment) 4001, a segmentation and CRC attachment unit (Segmentation and CRC unit) 401, a coding unit (Encoder) 4002, a sub-block interleaver unit (Sub-block interleaver) 4003, a bit collection unit (Bit collection) 4004, a bit selection and pruning (Bit selection and pruning) unit 4005, and a concatenation unit (Concatenation) 4006. The segmentation and CRC unit 401 includes at least one of a code block segmentation unit 4011, and one or more CRC attachment units 4012.

A transport block (also referred to as $a_k$) may be input to the CRC attachment unit 4001. The CRC attachment unit

4001 may generate CRC bit(s) as an error detecting redundancy bit(s) based on the input transport block. The generated CRC bit(s) are added to the transport block. The transport block to which the CRC bit(s) are added (also referred to as $b_k$) is output from the CRC attachment unit 4001. In the CRC attachment unit 4001, the number of the CRC bit(s) added to the transport block may be given based on information included in a higher layer signal. In the CRC attachment unit 4001, the number of the CRC bit(s) added to the transport block may be given based on information included in a control channel. In the CRC attachment unit 4001, the number of the CRC bit(s) added to the transport block may be given based on preliminarily configured information. In the CRC attachment unit 4001, the number of the CRC bit(s) added to the transport block may be given based on the scheme of the error correction coding.

For example, the CRC attachment unit 4001 may add the CRC bit(s) to the transport block coded by turbo code, and may not add the CRC bit(s) to the transport block to which the other error correcting codes (e.g., the LDPC code) are applied. Furthermore, for example, the CRC attachment unit 4001 may add the CRC bit(s) of 24 bits to the transport block to which the turbo code is applied, and may add CRC bit(s) which is not 24 bits (smaller than 24 bits, or greater than 24 bits) to the transport block to which the other error correcting codes (e.g., the LDPC code) are applied.

For example, the $b_k$ may be input to the code block segmentation unit 4011. The code block segmentation unit 4011 may divide the $b_k$ into one or more code blocks. For example, in a case that the $b_k$ satisfies $b_k>Z$, the $b_k$ may be divided into multiple code blocks. Here, Z is a maximum code block length.

The maximum code block length Z may be given based on the transport block size. Here, the transport block size includes the size (or amount) of the transport block (or, the data block, the transport data, the transmission data, the transmission code, the transmission block, the payload, the information, the information block and the like). In other words, the transport block size may be the data block size, the transport data size, the transmission data size, the transmission code size, the transmission block size, the payload size, the information size, the information block size, the data block amount, the transport data amount, the transmission data amount, the transmission code amount, the transmission block amount, the payload amount, the amount information, the information block amount and the like. For example, in a case that a certain transport block size $N_{TBS}$ satisfies $N_{TBS}>Z_t$, the maximum code block length Z may be $Z_1$, and in a case that $N_{TBS}<Z_t$ is satisfied, the maximum code block length Z may be $Z_2$. Here, the $Z_t$, $Z_1$ and $Z_2$ may be given based on information included in a higher layer signal. $Z_t$, $Z_1$, $Z_2$ may be given based on information included in a control channel. $Z_t$, $Z_1$, $Z_2$ may be given based on preliminarily configured information. The maximum code block length Z of the transport block may be given based on the transport block size and the modulation scheme (QPSK, 16 QAM, 64 QAM and the like). Here, "based on the transport block size and the modulation scheme" may be based on the ratio (or, a value relating to the modulation symbol number) of the transport block size and the modulation order of the modulation scheme applied to the transport block. The modulation order indicates the number of bits (scramble bits) corresponding to one modulation symbol. The modulation order for QPSK is 2. The modulation order for 16 QAM is 4. The modulation order for 64 QAM is 6. Furthermore, the maximum code block length Z of the transport block may be given based on the ratio of the transport block size of the transport block and the resource element number included in the channel including the transport block. Here, the transport block size of the transport block may be represented by the sum of at least one code block size generated from the transport block. Furthermore, the resource element number included in the channel including the transport block may be represented by a resource element number allocated to the terminal apparatus 1 which is given by scheduling information (e.g., in a case of downlink communication, a downlink grant; and furthermore, in a case of uplink communication, uplink grant). Here, a resource element number allocated to the terminal apparatus 1 may be given by the product of the allocated subcarrier number and the symbol number. Furthermore, a resource element number allocated to the terminal apparatus 1 may be given as a value obtained by subtracting the resource element included in a prescribed region from the product of the allocated subcarrier number and the symbol number. Here, the prescribed region may be a region including the reference signal channel. Furthermore, the prescribed region may be a region including the synchronization channel.

The maximum code block length Z of the transport block may be given based on the component carrier (or, the bandwidth of the component carrier, the serving cell, the bandwidth of the serving cell and the like). For example, the maximum code block length Z of the transport block may be given based on the component carrier for the channel including the transport block. The maximum code block length Z of the transport block may be given based on whether the serving cell for the channel including the transport block is the primary cell or the secondary cell. Here, the primary cell may include the primary secondary cell. Furthermore, the secondary cell may include the primary secondary cell. Furthermore, for example, the maximum code block length Z of the transport block may be given based on whether the serving cell for the channel including the transport block is the primary secondary cell. Furthermore, the maximum code block length Z of the transport block may be given based on which of the SCG and the MCG includes the serving cell for the channel including the transport block. The maximum code block length Z of the transport block may be given based on whether the serving cell for the channel including the transport block is a licensed band or an unlicensed band. Here, the component carrier of the channel may be the component carrier on which the channel is transmitted. Furthermore, the component carrier for the channel may be the component carrier on which the channel is transmitted.

The maximum transport block length Z of the transport block may be given based on the ID of the serving cell (e.g., the Physical Cell ID (PCID), Virtual Cell ID (VCID) and the like). The maximum transport block length Z of the transport block may be given based on the ID of the serving cell for the channel including the transport block.

The maximum code block length Z of the transport block may be given based on whether the frequency hopping is applied. For example, in a case that the frequency hopping is applied to the channel including the transport block, the maximum code block length Z of the transport block may have a value greater (or, smaller) than a prescribed value. Furthermore, for example, in a case that the frequency hopping is not applied to the channel including the transport block, the maximum code block length Z of the transport block may have a value smaller (or, larger) than a prescribed value.

The maximum code block length Z of the transport block may be given based on the subcarrier interval. For example, the maximum code block length Z of the transport block may be given based on the subcarrier interval for the channel including the transport block. Furthermore, the maximum code block length Z of the transport block may be a prescribed value in a case that the subcarrier interval for the channel including the transport block is 15 kHz. Furthermore, a value other than the prescribed value may be configured in a case that the subcarrier interval for the channel including the transport block is not 15 kHz. Here, the subcarrier interval of the channel may be the subcarrier interval in the signal waveform of the signal transmitted in the channel. Furthermore, the subcarrier interval for the channel may be the subcarrier interval in the signal waveform of the signal transmitted in the channel. Furthermore, one channel may have multiple subcarrier intervals.

The maximum code block length Z of the transport block may be given based on the TTI length (or the symbol number) for the channel including the transport block. For example, in a case that the TTI length for the channel including the transport block is smaller than 1 ms, the maximum code block length Z of the transport block may be a value smaller than a prescribed value. Furthermore, for example, in a case that the TTI length for the channel including the transport block is greater than 1 ms, the maximum code block length Z of the transport block may be greater than a prescribed value. Furthermore, the maximum code block length Z of the transport block may be a prescribed value in a case that the symbol number for the channel including the transport block is 14. Furthermore, the maximum code block length Z of the transport block may be a value other than the prescribed value in a case that the symbol number for the channel including the transport block is not 14. Here, the TTI length (or the symbol number) for the channel including the transport block may be the channel length (symbol number) in a time domain. Furthermore, the TTI length (or the symbol number) of the channel including the transport block may be the channel length (symbol number) in a time domain.

The maximum code block length Z of the transport block may be determined based on the signal waveform. For example, the maximum code block length Z of the transport block may be given based on the signal waveform of the channel including the transport block. For example, the maximum code block length Z of the transport block may be a prescribed value in a case that the signal waveform of the channel including the transport block is a prescribed signal waveform, and may be a value other than the prescribed value in a case that the signal waveform of the channel including the transport block is not the prescribed signal waveform. Here, for example, the prescribed signal waveform may be OFDM. Furthermore, the prescribed signal waveform may be DFT-s-OFDM.

The maximum code block length Z of the transport block may be given based on the error correcting code applied to the transport block (e.g., the type of the error correcting code, the size of generation matrix, the generation method of the generation matrix, the size of the check matrix, the generation method of the check matrix, the coding rate, presence/absence of the outer code and the like). For example, the maximum code block length Z of the transport block may be a prescribed value in a case that the error correcting code applied to the transport block is the turbo code, and may be a value other than the prescribed value in a case that the error correcting code applied to the transport block is not the turbo code. Furthermore, the maximum code block length Z of the transport block may be a prescribed value in a case that the coding rate of the error correcting code applied to the transport block is ⅓, and may be a value other than the prescribed value in a case that the coding rate of the error correcting code applied to the transport block is not ⅓. Furthermore, for example, the maximum code block length Z of the transport block may be a prescribed value in a case that the outer code is not applied to the transport block, and may be a value other than the prescribed value in a case that the outer code is applied to the transport block.

The coding output of the LDPC code may be given by multiplying information bit(s) (e.g., transport block, code block and the like) by the generation matrix. Furthermore, the LDPC code decoding may be performed based on the check matrix. For example, the decoding process of the LDPC code may be a process on which belief propagation is applied based on a graph (e.g., factor graph, Bayesian network and the like) generated based on the check matrix. For example, in a case that the generation matrix is $P_L$ and the check matrix is $H_L$, $P_L$ and $H_L$ may be given so as to satisfy $P_L*H_L=0$. Here, $P_L$ and $H_L$ are matrices composed only of 0 or 1. Furthermore, $P_L*H_L$ is a matrix operation given by a logical multiplication of $P_L$ and $H_L$. By the condition $P_L*H_L=0$, check matrix $H_L$ is generated in a case that generation matrix $P_L$ is given. Furthermore, by the condition of $P_L*H_L=0$, generation matrix $P_L$ is generated in a case that check matrix $H_L$ is given.

In the LDPC code (or other block code and the like), the code block size may be given by the check matrix, or the size of generation matrix. In other words, the code block size may be given based on the check matrix or the size of generation matrix. Furthermore, the transport block size may be given based on the check matrix or the size of generation matrix. The information included in a higher layer signal may be given based on the check matrix or generation matrix. Furthermore, the check matrix or generation matrix may be given based on information included in a control channel.

The maximum code block length Z of the transport block may be given based on the number of the CRC bit(s) added to the transport block and/or the code block included in the transport block. For example, in a case that the number of the CRC bit(s) are added to the transport block and/or the code block included in the transport block, the maximum code block length Z of the transport block may be a prescribed value. For example, in a case that the number of the CRC bit(s) are not added to the transport block and/or the code block included in the transport block, the maximum code block length Z of the transport block may be a value other than the prescribed value. Furthermore, for example, in a case that the CRC bit(s) added to the transport block and/or the code block included in the transport block is 24 bits, the maximum code block length Z of the transport block may be a prescribed value. Furthermore, in a case that the CRC bit(s) added to the transport block and/or the code block included in the transport block is not 24 bits, the maximum code block length Z of the transport block may be a value other than the prescribed value.

The maximum code block length Z may be given based on the duplex scheme applied to the serving cell. Furthermore, the maximum code block length Z of the transport block may be given based on the duplex scheme applied to the serving cell for the channel including the transport block.

Here, the prescribed value may be 6144. Furthermore, the prescribed value may be a value defined by a specification or the like, and may be known to both the base station apparatus 3 and the terminal apparatus 1. Furthermore, the prescribed value may be given based on information transmitted from the base station apparatus 3. Furthermore, values other than the prescribed value may be smaller than the prescribed value. Furthermore, values other than the prescribed value may be greater than the prescribed value. Furthermore, the prescribed value may be a value preliminarily configured in the terminal apparatus 1.

Here, the maximum code block length Z may mean the code block length.

The code block lengths of multiple code blocks generated from one transport may be equal among the block code blocks. Furthermore, the code block lengths of multiple code blocks constituting one transport block may differ among code blocks. Here, the code block lengths of multiple code blocks configuring one transport block is also referred to as a code block length.

The code block length may be a unit of the error correction coding. In other words, the error correction coding may be performed on each code block. As one aspect of the present invention, a process is described below based on an example in which error correction coding is performed on each code block. On the other hand, another aspect of the present invention may be based on a process in which error correction coding is performed on multiple code blocks.

The code block length is a factor in the ability of the error correcting code. For example, it is generally known that, in the turbo code and the LDPC code, the larger the code block length, the higher the ability of the error correction. On the other hand, it is generally known that the greater the code block length of the error correcting code, the greater the amount of computation in the error correction decoding process in the reception process. In other words, the code block length may be designed based on at least one of the ability of error correction and the computation amount of the error correction decoding process. Here, the reception process is a process of decoding the transport block coded based on the transmission process.

Figure 7:
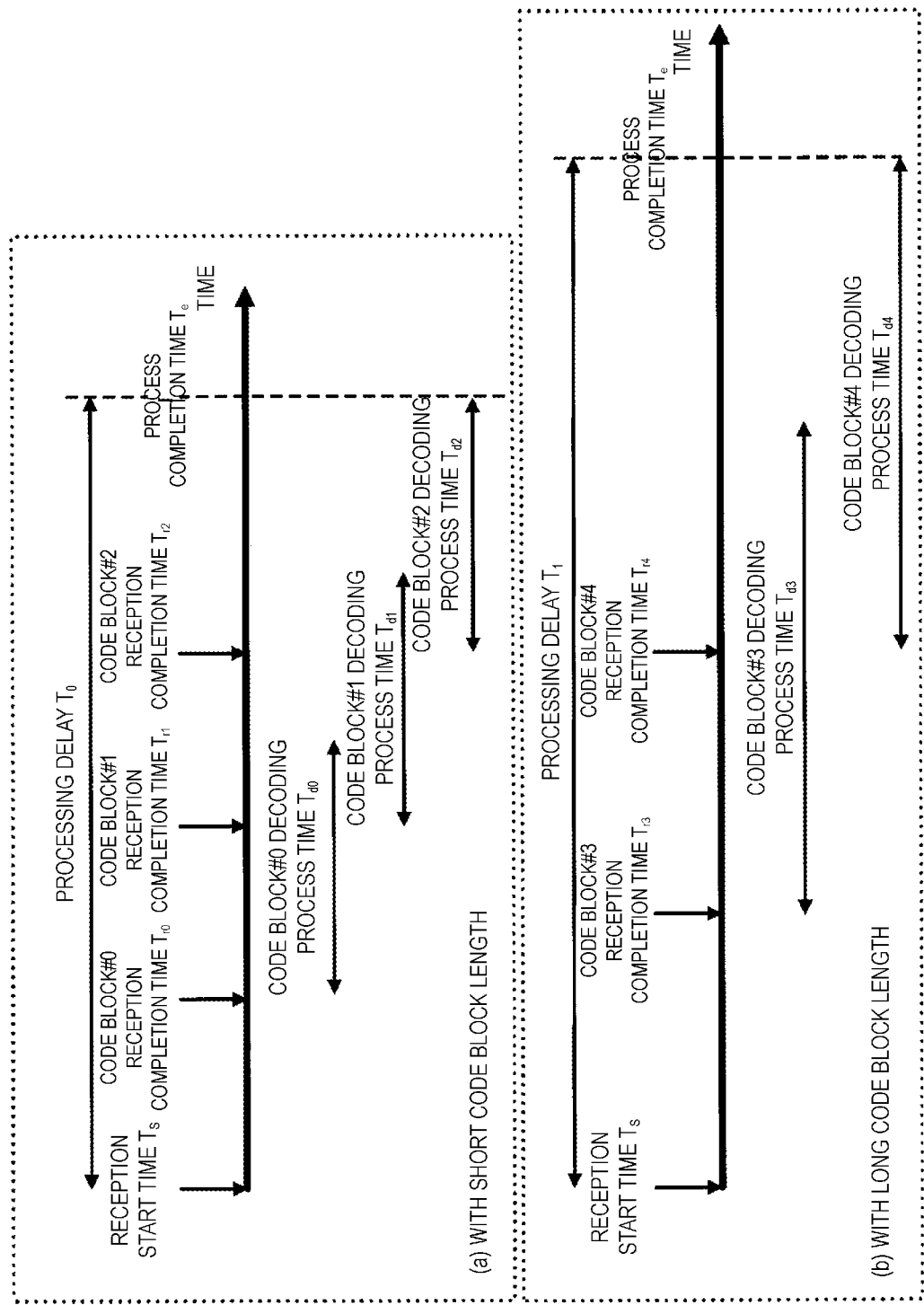
FIG. 7 is a diagram illustrating a concept of processing delay in a reception process according to the present embodiment.

The code block length may be designed based on the processing delay in the reception process. FIG. 7 illustrates a concept of processing delay in a reception process of the present embodiment. FIG. 7 illustrates an example of a reception process of a case that the transport block is divided into five code blocks (Code block #0, #1, #2, #3, #4). FIG. 7A illustrates an example of a case that the code block length is small (a case that the code block length is smaller than that of the example illustrated in FIG. 7B). FIG. 7B illustrates an example of a case that the code block length is large (a case that the code block length is larger than that of the example illustrated in FIG. 7A). Here, the reception start time of the transport block is T. Furthermore, the reception completion time of Code block # x is $T_{rx}$ (x is any of 0 to 4). Furthermore, the decoding process time of Code block # x is $T_{dx}$. Furthermore, the process completion time in FIG. 7A is $T_e$. Furthermore, the process completion time in FIG. 7B is $T_E$. Furthermore, the processing delay in FIG. 7A is $T_0$ ($T_0 = T_e - T_s$). Furthermore, the processing delay in FIG. 7B is $T_1$ ($T_1 = T_E - T_s$).

In view of the code block length, $T_{r0}$ is expected to be earlier than $T_{r3}$. Therefore, the decoding start of Code block #0 is expected to be earlier than the decoding start of Code block #3. In other words, a short length of the code block achieves an early start of the decoding process in the reception process. An early start of the decoding process is expected to contribute to shortening of processing delay $T_0$. This is expected to be significant in a case that the decoding process of multiple code blocks cannot be simultaneously performed, a case that the number processes which are simultaneously proceeded as the decoding process of the code block is limited, and the like case.

In examples illustrated in FIG. 7A and FIG. 7B, $T_{r2}$ and $T_{r4}$ are assumed to be $T_{r2} = T_{r4}$. In this case, from the relationship of the code block length, $T_{d2} < T_{d4}$ holds true, and $T_e < T_E$ is expected to hold true. In other words, a short code block length can be a factor of achieving early completion of the decoding process of the reception process. Early completion of the decoding process is expected to contribute to shortening of processing delay $T_0$.

The code block segmentation unit 4011 may output C' (C' is an integer of 1 or more) code blocks ($C_{0k}$ to $C_{C'k}$).

The code block may be input to a CRC attachment unit 4012. The CRC attachment unit 4012 may generate CRC bit(s) based on the code block. Furthermore, the CRC attachment unit 4012 may add the generated CRC bit(s) to the code block. Furthermore, the CRC attachment unit 4012 may output a sequence ($c_{0k}$ to $c_{C'k}$) added with the CRC bit(s) to the code block. Here, in a case that no code block segmentation has been performed (a case of C'=1), the CRC attachment unit 4012 may not add the CRC to the code block.

In the CRC attachment unit 4012, the number of the CRC bit(s) added to the code block may be given based on information included in a higher layer signal. In the CRC attachment unit 4012, the number of the CRC bit(s) added to the code block may be given based on information included in a control channel. In the CRC attachment unit 4012, the number of the CRC bit(s) added to the code block may be given based on preliminarily configured information. In the CRC attachment unit 4012, the number of the CRC bit(s) added to the code block may be given based on the type of the error correction coding.

Each code block output from the CRC attachment unit 4012 is input to the coding unit 4002. In a case of C'>1, input to the coding unit 4002 is a sequentially selected code block. In the following description, each of one code block input to the coding unit 4002 ($C_{0k}$ to $C_{C'k}$) is also referred to as $C_k$.

The coding unit 4002 has a function of performing error correction coding on input code block $C_k$. For example, the error correction coding may be the turbo code, the LDPC code, the Polar code, the convolutional code (e.g., Tail biting convolutional code (TBCC)) and the like), the Reed-Muller code (RM code), the iteration code, the reed solomon code, the cyclic code, the parity check code or the like. The coding unit 4002 may perform an error correction coding process on the code block $C_k$, and output the coded bit(s) (Coded bit(s)). The coded bit(s) to be output may be $d_k^{(0)}$, $d_k^{(1)}$ and $d_k^{(2)}$. Here, the $d_k^{(0)}$ may be systematic bit(s). The $d_k^{(1)}$ and $d_k^{(2)}$ may be parity bit(s). The coded bit(s) are also referred to as subblock(s). The number of the subblock output from the coding unit 4002 may not be three, $d_k^{(0)}$, $d_k^{(1)}$ and $d_k^{(2)}$, but may be two or smaller, or four or greater.

The LDPC coding may be a Quasi-Cyclic-Low Density Parity Check (QC-LDPC) coding. The LDPC coding may be a Low Density Parity Check-Convolutional codes (LDPC-CC) coding. The LDPC coding may be a coding scheme for generating a pair of systematic bits $d_s$ and a pair of parity bits $d_p$. Here, in a case that the scheme of the error correcting code is a non-systematic code, the coding scheme may be a scheme for generating a pair of bits $d_s$.

The coding unit 4002 may have a function of mapping bit(s) $d_s$ and/or bit(s) $d_p$ generated by the LDPC coding to $d_k^{(0)}$, $d_k^{(1)}$ and $d_k^{(2)}$. For example, in a case that the coding rate is 1/3, systematic bit(s) of K bits and parity bit(s) of 2K bits may be generated for code block length K. For example, the systematic bit(s) $d_s^{(k)}$ may be mapped to $d_k^{(0)}$, the parity bit(s) $d_p$ (2k) may be mapped to $d_k^{(1)}$, and the parity bit(s) $d_p$ (2k+1) may be mapped to $d_k^{(2)}$. Here, the $d_s$ (k) is a k-th bit of systematic bit(s) $d_s$. Furthermore, the $d_p$ (k) is a k-th bit of the parity bit(s) $d_p$. In other words, the bit(s) generated by the LDPC code may be mapped based on the number of the sub-block interleavers (or three).

The coded bit(s) output from the coding unit 4002 may be input to the sub-block interleaver unit 4003. The coded bit(s) output from the coding unit 4002 may be input to the bit collection unit 4004. Whether the sub-block interleaver unit 4003 or the bit collection unit 4004 receives an input of the coded bit(s) may be given based on information included in the control channel or the higher layer signal. Whether the sub block interleaver unit 4003 or the bit collection unit 4004 receives an input of the coded bit(s) may be given based on at least one of the length of the symbol, the signal waveform, the scheme of the error correcting code, and the component carrier. Input of the coded bit(s) output from the coding unit 4002 to the sub-block interleaver unit 4003 means that the sub-block interleaver is applied to the coded bit(s). Input of the coded bit(s) output from the coding unit 4002 to the bit collection unit 4004 means that the sub-block interleaver is not applied to the coded bit(s).

The error correcting code applied to the code block may be given based on information included in a higher layer signal. The error correcting code applied to the code block may be given based on information included in a control channel. The error correcting code applied to the code block may be given based on the signal waveform for the channel including the code block. The error correcting code applied to the code block may be given based on the subcarrier interval for the channel including the code block. The error correcting code applied to the code block may be given based on preliminarily configured information.

Figure 8:
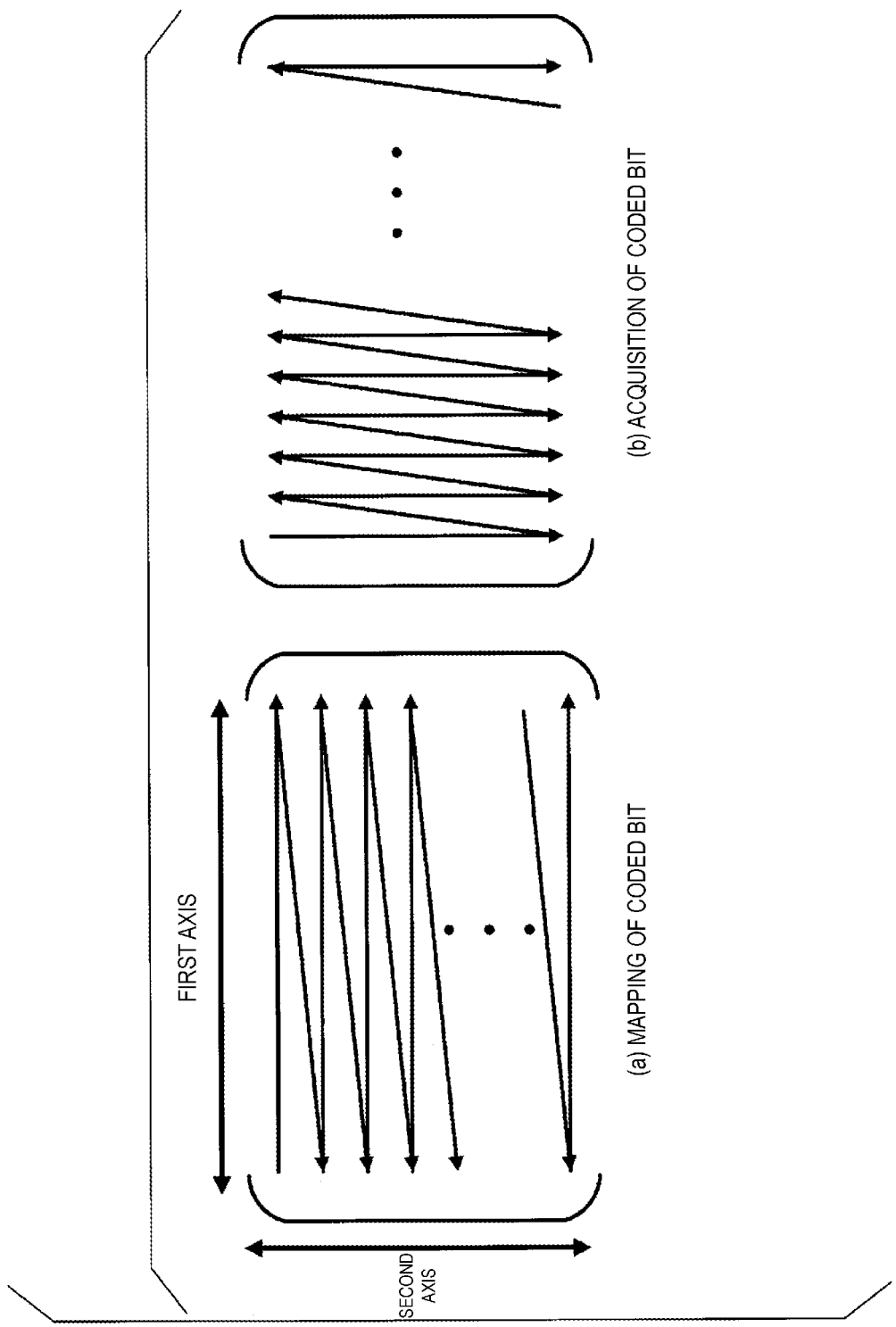
FIG. 8 is a diagram illustrating an example of coded bit(s) array change by a sub-block interleaver unit 4003 according to the present embodiment.

The coded bit(s) may be input to the sub-block interleaver unit 4003. The sub-block interleaver unit 4003 may change the array of the coded bit(s). FIG. 8 illustrates an example of change of the coded bit(s) array by the sub-block interleaver unit 4003 of the present embodiment. The sub-block interleaver unit 4003 may map the coded bit(s) to a two-dimensional block B. Here, the block B may be one dimensional, or have three or greater dimensions. For example, the block B may include a first axis and a second axis. Here, the first axis is also referred to as a horizontal axis, or a column. The second axis is also referred to as a vertical axis, or a row. In the block B, a point specified by one certain point on the first axis and one certain point on the second axis is also referred to as an element. Here, one element may be one coded bit (or, may correspond to one coded bit). The sub-block interleaver unit 4003 may prioritize the first axis in mapping (writing) of the coded bit(s). Here, the mapping method illustrated in FIG. 8A illustrates an example of a method in which the first axis is prioritized in mapping. Specifically, the mapping which prioritizes the first-axis is mapping based on the following procedure (or, based on repetition based on the following procedure).

(1) Mapping in the first axis direction with respect to one point (one row) on the second axis.

(2) Mapping in the first axis direction with respect to next one point on the second axis.

For example, in a case that the first axis is a time axis and the second axis is a frequency axis, the mapping which prioritizes the first axis means mapping which prioritizes the time axis (Time first mapping). The mapping which prioritizes the second axis means mapping which prioritizes the frequency axis (Frequency first mapping).

Here, the number of columns of the first axis may be 32, and the number of rows of the second axis may be a minimum integer value which is not smaller than a value obtained by dividing the coded bit(s) by 32. In a case that the coded bit(s) are mapped in the first-axis prioritized manner, null(s) (or dummy bit(s)) may be mapped to an element to which the coded bit(s) are not mapped.

For example, the sub-block interleaver unit 4003 may have a function of performing a different process based on the input. In a case that the input is $d_k^{(0)}$ or $d_k^{(1)}$, a Permutation pattern may not be applied to the block B. On the other hand, in a case that the input is $d_k^{(2)}$, the permutation pattern may be applied to the block B. In other words, in the sub-block interleaver unit 4003, application of the permutation pattern may be switched based on the input coded bit(s). The application of the permutation pattern may be a process of rearranging the order in the first axis. For example, a permutation pattern P may be P=[0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31].

For example, the sub-block interleaver unit 4003 may prioritize the second axis in a case of acquiring (reading) the coded bit(s) mapped to the block B. Here, the mapping method illustrated in FIG. 8B is an example of a method of mapping which prioritizes the second axis. The sub-block interleaver unit 4003 outputs rearrangement bits (e.g., $v_k^{(0)}$, $v_k^{(1)}$ and $v_k^{(2)}$) acquired in the second-axis prioritized manner.

For example, in a case that the coded bit(s) are mapped in the first-axis prioritized manner, and acquired in the second-axis prioritized manner, the order of the rearrangement bit(s) and the coded bit(s) input to the sub-block interleaver unit 4003 is switched. In other words, the sub-block interleaver unit 4003 may have a function of switching the order of the coded bit(s) and the rearrangement bit(s). Here, in a case that the axis prioritized in mapping to the block B and the axis prioritized in acquisition from the block B are different from each other, the operation in the sub-block interleaver unit 4003 is also referred to as arrangement switching (or, interleave, rearrangement or the like). Note that, in a case that the axis prioritized in mapping to the block B and the axis prioritized in acquisition from the block B are identical to each other, the arrangement switching is not performed in the sub-block interleaver unit 4003 (the order of the rearrangement bit(s) and the coded bit(s) input to the sub-block interleaver unit 4003 is not changed).

For example, whether the arrangement switching of the coded bit(s) by the sub-block interleaver unit 4003 is performed may be given based on the transport block size (or, the coded bit(s) number). For example, in a case that the transport block size $N_{TBS}$ satisfies $N_{TBS} > Z_t$, the arrangement switching of the coded bit(s) by the sub-block interleaver unit 4003 may be performed. Furthermore, in a case that transport block size $N_{TBS}$ satisfies $N_{TBS} < Z_t$, the arrangement switching of the coded bit(s) by the sub-block interleaver unit 4003 may not be performed. Furthermore, whether the arrangement switching of the coded bit(s) by the sub-block interleaver unit 4003 is performed may be given based on the transport block size of the transport block including the coded bit(s) and the modulation scheme (QPSK, 16 QAM, 64 QAM and the like). Here, "based on the transport block size and the modulation scheme" may be based on the ratio of the modulation order of the modulation scheme applied to the transport block and the transport block size (or, a value relating to the modulation symbol number). Furthermore, whether the arrangement switching of the coded bit(s) by the sub-block interleaver unit 4003 is performed may be given based on the ratio of the resource element number of the channel including the transport block including the coded bit(s) and the transport block size of the transport block including the coded bit(s). Here, the transport block size of the transport block may be represented by the sum of at least one code block size generated from the transport block. Furthermore, the resource element number included in the channel including the transport block may be represented by a resource element number allocated to the terminal apparatus 1 which is given by scheduling information (e.g., in a case of downlink communication, a downlink grant; and furthermore, in a case of uplink communication, uplink grant). Here, a resource element number allocated to the terminal apparatus 1 may be given by the product of the allocated subcarrier number and the symbol number. Furthermore, a resource element number allocated to the terminal apparatus 1 may be given as a value obtained by subtracting the resource element included in a prescribed region from the product of the allocated subcarrier number and the symbol number. Here, the prescribed region may be a region including the reference signal channel. Furthermore, the prescribed region may be a region including the synchronization channel.

For example, whether the arrangement switching of the coded bit(s) by the sub-block interleaver unit 4003 is performed may be given based on the component carrier (or, the serving cell, the bandwidth of the serving cell and the like). For example, whether the arrangement switching of the coded bit(s) by the sub-block interleaver unit 4003 is performed may be given based on the component carrier for the channel including the coded bit(s). Whether the arrangement switching of the coded bit(s) by the sub-block interleaver unit 4003 is performed may be given based on whether the serving cell for the channel including the coded bit(s) is the primary cell or the secondary cell. Here, the primary cell may include the primary secondary cell. Furthermore, the secondary cell may include the primary secondary cell. Furthermore, for example, whether the arrangement switching of the coded bit(s) by the sub-block interleaver unit 4003 is performed may be given based on whether the cell for the channel including the coded bit(s) is the primary secondary cell. Whether the arrangement switching of the coded bit(s) by the sub-block interleaver unit 4003 is performed may be given based on which of the SCG and the MCG includes the serving cell for the channel including the coded bit(s). Whether the arrangement switching of the coded bit(s) by the sub-block interleaver unit 4003 is performed may be given based on whether the serving cell for the channel including the coded bit(s) is a licensed band or an unlicensed band.

Whether the arrangement switching of the coded bit(s) by the sub-block interleaver unit 4003 is performed may be given based on the ID of the serving cell. Whether the arrangement switching of the coded bit(s) by the sub-block interleaver unit 4003 is performed may be given based on the ID of the serving cell for the channel including the coded bit(s).

Whether the arrangement switching of the coded bit(s) by the sub-block interleaver unit 4003 is performed may be given based on whether the frequency hopping is applied to the channel including the coded bit(s). For example, in a case that the frequency hopping is applied to the channel including the coded bit(s), the arrangement switching of the coded bit(s) may be performed by the sub-block interleaver unit 4003. Furthermore, for example, in a case that the frequency hopping is not applied to the channel including the coded bit(s), the arrangement switching of the coded bit(s) may not be performed by the sub-block interleaver unit 4003.

Whether the arrangement switching of the coded bit(s) by the sub-block interleaver unit 4003 is performed may be given based on the subcarrier interval. For example, whether the arrangement switching of the coded bit(s) by the sub-block interleaver unit 4003 is performed may be given based on the subcarrier interval for the channel including the coded bit(s). For example, in a case that the subcarrier interval for the channel including the coded bit(s) is 15 kHz, the arrangement switching of the coded bit(s) may be performed by the sub-block interleaver unit 4003. Furthermore, in a case that the subcarrier interval for the channel including the coded bit(s) is not 15 kHz, the arrangement switching of the coded bit(s) may not be performed by the sub-block interleaver unit 4003.

Whether the arrangement switching of the coded bit(s) by the sub-block interleaver unit 4003 is performed may be given based on the TTI length for the channel including the coded bit(s) (or the symbol number). For example, in a case that the TTI length for the channel including the coded bit(s) is smaller than 1 ms, the arrangement switching of the coded bit(s) may be performed by the sub-block interleaver unit 4003. Furthermore, in a case that the TTI length for the channel including the coded bit(s) is greater than 1 ms, the arrangement switching of the coded bit(s) may not be performed by the sub-block interleaver unit 4003. Furthermore, in a case that the TTI length for the channel including the coded bit(s) is smaller than 1 ms, the arrangement switching of the coded bit(s) may not be performed by the sub-block interleaver unit 4003. Furthermore, in a case that the TTI length for the channel including the coded bit(s) is greater than 1 ms, the arrangement switching of the coded bit(s) may be performed by the sub-block interleaver unit 4003. Furthermore, whether the arrangement switching of the coded bit(s) by the sub-block interleaver unit 4003 is performed may be given based on whether the symbol number for the channel including the coded bit(s) is 14. For example, in a case that the symbol number of the channel including the coded bit(s) is smaller than 14, the arrangement switching of the coded bit(s) may be performed by the sub-block interleaver unit 4003. Furthermore, in a case that the symbol number of the channel including the coded bit(s) is greater than 14, the arrangement switching of the coded bit(s) may not be performed by the sub-block interleaver unit 4003. Furthermore, in a case that the symbol number of the channel including the coded bit(s) is smaller than 14, the arrangement switching of the coded bit(s) may not be performed by the sub-block interleaver unit 4003. Furthermore, in a case that the symbol number of the channel including the coded bit(s) is greater than 14, the arrangement switching of the coded bit(s) may be performed by the sub-block interleaver unit 4003.

Whether the arrangement switching of the coded bit(s) by the sub-block interleaver unit 4003 is performed may be given based on the signal waveform. For example, whether the arrangement switching of the coded bit(s) by the sub-block interleaver unit 4003 is performed may be given based on the signal waveform for the channel including the coded bit(s). For example, in a case that the signal waveform of the channel including the coded bit(s) is a prescribed signal waveform, the arrangement switching of the coded bit(s) may be performed by the sub-block interleaver unit 4003. Furthermore, in a case that the signal waveform of the channel including the coded bit(s) is a waveform other than the prescribed signal waveform, the arrangement switching of the coded bit(s) may not be performed by the sub-block interleaver unit 4003. Here, for example, the prescribed signal waveform may be OFDM. Furthermore, the prescribed signal waveform may be DFT-s-OFDM.

Whether the arrangement switching of the coded bit(s) by the sub-block interleaver unit 4003 is performed may be given based on the error correcting code applied to the transport block including the coded bit(s) (e.g., the type of the error correcting code, the size of the check matrix, the generation method of the check matrix, the coding rate, presence/absence of the outer code and the like). For example, in a case that the error correcting code applied to the transport block including the coded bit(s) is the turbo code, the arrangement switching of the coded bit(s) may be performed by the sub-block interleaver unit 4003. Furthermore, in a case that the error correcting code applied to the transport block including the coded bit(s) is a code other than the turbo code, the arrangement switching of the coded bit(s) may not be performed by the sub-block interleaver unit 4003. Furthermore, in a case that the coding rate of the error correcting code applied to the transport block including the coded bit(s) is ⅓, the arrangement switching of the coded bit(s) may be performed by the sub-block interleaver unit 4003. Furthermore, in a case that the coding rate of the error correcting code applied to the transport block including the coded bit(s) is a ratio other than ⅓, the arrangement switching of the coded bit(s) may not be performed by the sub-block interleaver unit 4003. Furthermore, in a case that the outer code is not applied to the transport block including the coded bit(s), the arrangement switching of the coded bit(s) may be performed by the sub-block interleaver unit 4003. Furthermore, in a case that the outer code is applied to the transport block including the coded bit(s), the arrangement switching of the coded bit(s) may not be performed by the sub-block interleaver unit 4003.

Whether the arrangement switching of the coded bit(s) by the sub-block interleaver unit 4003 is performed may be given based on the number of the CRC bit(s) added to the transport block including the coded bit(s) and/or the code block used for generation of the coded bit(s). For example, in a case that the CRC bit(s) added to the transport block including the coded bit(s) and/or the code block used for generation of the coded bit(s) is added, the arrangement switching of the coded bit(s) may be performed by the sub-block interleaver unit 4003. Furthermore, in a case that the CRC bit(s) added to the transport block including the coded bit(s) and/or the code block used for generation of the coded bit(s) is not added, the arrangement switching of the coded bit(s) may not be performed by the sub-block interleaver unit 4003. Furthermore, in a case that the CRC bit(s) added to the transport block including the coded bit(s) and/or the code block used for generation of the coded bit(s) is 24 bits, the arrangement switching of the coded bit(s) may be performed by the sub-block interleaver unit 4003. Furthermore, in a case that the CRC bit(s) added to the transport block including the coded bit(s) and/or the code block used for generation of the coded bit(s) is not 24 bits, the arrangement switching of the coded bit(s) may not be performed by the sub-block interleaver unit 4003.

For example, whether the arrangement switching of the coded bit(s) by the sub-block interleaver unit 4003 is performed may be given based on the duplex scheme for the serving cell. Furthermore, whether the arrangement switching of the coded bit(s) by the sub-block interleaver unit 4003 is performed may be given based on the duplex scheme applied to the serving cell for the channel including the transport block including the coded bit(s).

Here, the axis prioritized for the mapping in the arrangement switching of the coded bit(s) may be the time axis (Time first mapping). Furthermore, the axis prioritized for the mapping in the arrangement switching of the coded bit(s) may be the frequency axis (Frequency first mapping).

For example, the rearrangement bit(s) may be input to the bit collection unit 4004. The bit collection unit 4004 may have a function of generating a Virtual circular buffer based on the rearrangement bit(s). The virtual circular buffer $w_k$ may be generated based on $w_k = v_k^{(0)}$, $w_{K_\Pi+2k} = v_k^{(1)}$, and $w_{K_\Pi+2k+1} = v_k^{(2)}$. Here, $K_\Pi$ is the element number of the entire block B, and $K_w$ is a value indicated by $K_w = 3K_\Pi$. The bit collection unit 4004 outputs the virtual circular buffer $w_k$.

For example, the virtual circular buffer may be input to the bit selection and pruning unit 4005. Furthermore, the bit selection and pruning unit 4005 may have a function of selecting the bit(s) in the virtual circular buffer based on the radio resource number. Here, the radio resource number may a resource element number which is given based on the scheduling information. Here, the resource element number may be given by the product of the allocated subcarrier number and the symbol number. The allocated subcarrier number or the allocated symbol number may be given based on the information included in the DCI transmitted from the base station apparatus 3. Furthermore, the resource element number may be given as a value obtained by subtracting the resource element included in a prescribed region from the product of the allocated subcarrier number and the symbol number. Here, the prescribed region may be a region including the reference signal channel. Furthermore, the prescribed region may be a region including the synchronization channel. Furthermore, the bit selection in the virtual circular buffer may be performed by setting index $k_0$ as the start point, and by cyclically acquiring the bit(s) in the virtual circular buffer $w_k$. Here, the acquired bit(s) are also referred to as $e_k$. The bit selection and pruning unit 4005 outputs $e_k$. For example, k 0 may be expressed as k $0=32*(2*\text{Ceil}(N_{cb}/(8*R^{TC}))*rv_{idx}+2)$. Here, Ceil (*) is a function that acquires a minimum integer under a condition not smaller than *. The $rv_{idx}$ is a Redundancy version. The redundancy version is determined by MCS information included in the DCI transmitted from the base station apparatus 3, and/or a New Data Indicator (NDI). The $N_{cb}$ is a soft buffer size. The $N_{cb}$ may be $N_{cb}=\min$ (floor $(N_{IR}/C')$, $K_w$) in a case of downlink communication, and may be $N_{cb}=K_w$ in a case of uplink communication. Here, the min (A, B) is a function for selecting smaller one of A and B. Furthermore, the floor (*) is a maximum integer not greater than *.

For example, the $e_k$ may be input to the concatenation unit 4006. Furthermore, the concatenation unit 4006 may have a function of generating concatenation bit(s) by coupling C' code blocks. The concatenation bit(s) are also referred to as $f_k$.

A process of the coding processing unit 3001 is described below in a case of uplink as an example. Note that also in a case of downlink communication, the coding processing unit 3001 may include at least one of the Control and data multiplexing unit 4007 and the Channel interleaver unit 4008.

Figure 9:
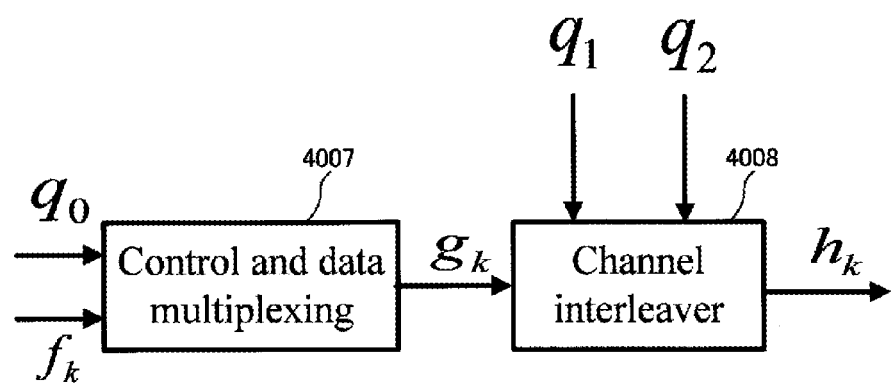
FIG. 9 is a diagram illustrating a part of a configuration example of a control information and data multiplexing unit 4007 and channel interleaver unit 4008 included in the coding processing unit 3001 in uplink according to the present embodiment.

FIG. 9 illustrates a part of an exemplary configuration of a control information and data multiplexing unit (Control and data multiplexing) 4007, and a channel interleaver unit (Channel interleaver) 4008 included in the coding processing unit 3001 in uplink of the present embodiment. In uplink, the coding processing unit 3001 may include at least one of the control information and data multiplexing unit (Control and data multiplexing) 4007 and the channel interleaver unit (Channel interleaver) 4008. For example, in uplink, the concatenation bit(s) $f_k$ output from the concatenation unit 4006 of the coding processing unit 3001 may be input to the control information and data multiplexing unit 4007 of the coding processing unit 3001 together with Uplink Control Information (UCI). Here, the uplink control information input to the control information and data multiplexing unit 4007 is also referred to as $q_0$. The $q_0$ may be coded bit(s) of the Channel State Information (CSI), for example. The channel state information may include Channel Quality Information (CQI), Precoding Matrix Indicator (PMI), and Rank Indicator (RI). Furthermore, the $q_0$ may be coded bit(s) of reception acknowledgement response (Acknowledgement: ACK) in downlink communication, for example. Furthermore, the control information and data multiplexing unit 4007 may multiplex $f_k$ and $q_0$ and output multiplex bit(s) $g_k$. Furthermore, in a case that $q_0$ is not input to the control information and data multiplexing unit 4007, the multiplex bit(s) $g_k$ output by the control information and data multiplexing unit 4007 may be $g_k=f_k$.

For example, the multiplex bit(s) $g_k$ may be input to the channel interleaver unit 4008 of the coding processing unit 3001. Here, the coded bit(s) $q_1$ of uplink control information, and/or the coded bit(s) $q_2$ of the uplink control information may be input to the channel interleaver unit. The channel interleaver unit 4008 may map the multiplex bit(s) $g_k$ to the block $B_1$. Here, the block $B_1$ is identical to the block B except for the number of columns and rows of the block $B_1$. For example, the number of columns of the first axis $C_{mux}$ of the block $B_1$ is 12. Furthermore, the number of rows of the second axis $R'_{mux}$ is $H/C_{mux}$. Here, H may be $g_k+q_1$ bit number. Furthermore, $C_{mux}$ and $R'_{mux}$ may be given so as to satisfy $H=C_{mux}*R'_{mux}$. Furthermore, one element of the block $B_1$ may be one multiplex bit (or, may correspond to one multiplex bit).

In a case that $q_1$ is input to the channel interleaver unit 4008, the channel interleaver unit 4008 may map $q_1$ to a prescribed element of the block $B_1$. The prescribed element may be an element indicated by a position defined in advance. Furthermore, the prescribed element may be given based on information included in a higher layer signal. Furthermore, the prescribed element may be given based on information included in a control channel. In the block $B_1$ in the channel interleaver unit 4008, one element may correspond to one group. The one group may include coded bit(s) of a number equal to a modulation order of a modulation scheme corresponding to the transport block.

The channel interleaver unit 4008 may map $g_k$ to the block $B_1$ in the first-axis prioritized manner. The channel interleaver unit 4008 may not map $g_k$ to an element to which $q_1$ is mapped.

In a case that $q_2$ is input to the channel interleaver unit 4008, the channel interleaver unit 4008 may map $q_2$ to a prescribed element. The prescribed element may be a position defined in advance. Furthermore, the prescribed element may be given based on information included in a higher layer signal. Furthermore, the prescribed element may be given based on information included in a control channel. Here, in a case that $q_1$ or $g_k$ is already mapped to the prescribed element, $q_1$ or $g_k$ may be punctured. Here, the prescribed element to which $q_1$ is mapped and the prescribed element to which $q_2$ is mapped may differ from each other.

The channel interleaver unit 4008 may acquire an element mapped in the block $B_1$ in the second-axis prioritized manner (i.e., the arrangement switching may be performed). The channel interleaver unit 4008 may acquire the element mapped in the block $B_1$ in the first-axis prioritized manner (i.e., arrangement switching may not be performed). The element acquired by the channel interleaver unit 4008 is also referred to as $h_k$.

For example, whether the arrangement switching of the multiplex bit(s) by the channel interleaver unit 4008 is performed may be given based on the transport block size (or, the coded bit(s) number). For example, in a case that the transport block size $N_{TBS}$ satisfies $N_{TBS}>Z_t$, the arrangement switching of the multiplex bit(s) by the channel interleaver unit 4008 may be performed. Furthermore, in a case that transport block size $N_{TBS}$ satisfies $N_{TBS}\leq Z_t$, the arrangement switching of the multiplex bit(s) by the channel interleaver unit 4008 may not be performed. Here, the $Z_t$, $Z_1$ and $Z_2$ may be given based on information included in a higher layer signal. Here, the $Z_t$, $Z_1$ and $Z_2$ may be given based on information included in a control channel. Furthermore, $Z_t$, $Z_1$, $Z_2$ may be given based on information included in a control channel. Furthermore, whether the arrangement switching of the multiplex bit(s) by the channel interleaver unit 4008 is performed may be given based on the transport block size including the multiplex bit(s) and the modulation scheme (QPSK, 16 QAM, 64 QAM and the like). Here, "based on the transport block size and the modulation scheme" may be based on the ratio of the modulation order of the modulation scheme applied to the transport block and the transport block size (or, a value relating to the modulation symbol number). Furthermore, whether the arrangement switching of the multiplex bit(s) by the channel interleaver unit 4008 is performed may be given based on the resource element number ratio of the transport block size of the transport block including the multiplex bit(s) and the channel including the transport block including the multiplex bit(s). Here, the transport block size of the transport block may be represented by the sum of at least one code block size generated from the transport block. Furthermore, the resource element number included in the channel including the transport block may be represented by a resource element number allocated to the terminal apparatus 1 which is given by scheduling information (e.g., in a case of downlink communication, a downlink grant; and furthermore, in a case of uplink communication, uplink grant). Here, a resource element number allocated to the terminal apparatus 1 may be given by the product of the allocated subcarrier number and the symbol number. Furthermore, a resource element number allocated to the terminal apparatus 1 may be given as a value obtained by subtracting the resource element included in a prescribed region from the product of the allocated subcarrier number and the symbol number. Here, the prescribed region may be a region including the reference signal channel. Furthermore, the prescribed region may be a region including the synchronization channel.

For example, whether the arrangement switching of the multiplex bit(s) by the channel interleaver unit 4008 is performed may be given based on the component carrier (or, the serving cell, the bandwidth of the serving cell and the like). For example, whether the arrangement switching of the multiplex bit(s) by the channel interleaver unit 4008 is performed may be given based on the component carrier for the channel including the multiplex bit(s). Whether the arrangement switching of the multiplex bit(s) by the channel interleaver unit 4008 is performed may be given based on whether the cell for the channel including the multiplex bit(s) is the primary cell or the secondary cell. Here, the primary cell may include the primary secondary cell. Furthermore, the secondary cell may include the primary secondary cell. Furthermore, for example, whether the arrangement switching of the multiplex bit(s) by the channel interleaver unit 4008 is performed may be given based on whether the cell for the channel including the multiplex bit(s) is the primary secondary cell. Whether the arrangement switching of the multiplex bit(s) by the channel interleaver unit 4008 is performed may be given based on whether the serving cell for the channel including the multiplex bit(s) is included in the SCG or in the MCG. Whether the arrangement switching of the multiplex bit(s) by the channel interleaver unit 4008 is performed may be given based on whether the serving cell for the channel including the multiplex bit(s) is a licensed band or an unlicensed band.

Whether the arrangement switching of the multiplex bit(s) by the channel interleaver unit 4008 is performed may be given based on the ID of the serving cell. Whether the arrangement switching of the multiplex bit(s) by the channel interleaver unit 4008 is performed may be given based on the ID of the serving cell for the channel including the multiplex bit(s).

Whether the arrangement switching of the multiplex bit(s) by the channel interleaver unit 4008 is performed may be given based on whether the frequency hopping is applied to the channel including the multiplex bit(s). For example, in a case that the frequency hopping is applied to the channel including the coded bit(s), the arrangement switching of the multiplex bit(s) may be performed by the channel interleaver unit 4008. Furthermore, in a case that the frequency hopping is not applied to the channel including the multiplex bit(s), the arrangement switching of the multiplex bit(s) may not be performed by the channel interleaver unit 4008.

Whether the arrangement switching of the multiplex bit(s) by the channel interleaver unit 4008 is performed may be given based on the subcarrier interval. For example, whether the arrangement switching of the multiplex bit(s) by the channel interleaver unit 4008 is performed may be given based on the subcarrier interval for the channel including the multiplex bit(s). Furthermore, in a case that the subcarrier interval for the channel including the multiplex bit(s) is 15 kHz, the arrangement switching of the multiplex bit(s) may be performed by the channel interleaver unit 4008. Furthermore, in a case that the subcarrier interval for the channel including the multiplex bit(s) is not 15 kHz, the arrangement switching of the multiplex bit(s) may not be performed by the channel interleaver unit 4008.

Whether the arrangement switching of the multiplex bit(s) by the channel interleaver unit 4008 is performed may be given based on the TTI length for the channel including the multiplex bit(s) (or the symbol number). For example, in a case that the TTI length for the channel including the coded bit(s) is smaller than 1 ms, the arrangement switching of the multiplex bit(s) may be performed by the channel interleaver unit 4008. Furthermore, in a case that the TTI length for the channel including the coded bit(s) is greater than 1 ms, the arrangement switching of the multiplex bit(s) may not be performed by the channel interleaver unit 4008. Furthermore, in a case that the TTI length for the channel including the multiplex bit(s) is smaller than 1 ms, the arrangement switching of the multiplex bit(s) may not be performed by the channel interleaver unit 4008. Furthermore, in a case that the TTI length for the channel including the multiplex bit(s) is greater than 1 ms, the arrangement switching of the multiplex bit(s) may be performed by the channel interleaver unit 4008. Furthermore, whether the arrangement switching of the multiplex bit(s) by the channel interleaver unit 4008 is performed may be given based on whether the symbol number for the channel including the multiplex bit(s) is 14. For example, in a case that the symbol number of the channel including the multiplex bit(s) is smaller than 14, the arrangement switching of the multiplex bit(s) may be performed by the channel interleaver unit 4008. Furthermore, in a case that the symbol number of the channel including the multiplex bit(s) is greater than 14, the arrangement switching of the multiplex bit(s) may not be performed by the channel interleaver unit 4008. Furthermore, in a case that the symbol number of the channel including the multiplex bit(s) is smaller than 14, the arrangement switching of the multiplex bit(s) may not be performed by the channel interleaver unit 4008. Furthermore, in a case that the symbol number of the channel including the multiplex bit(s) is greater than 14, the arrangement switching of the multiplex bit(s) may be performed by the channel interleaver unit 4008.

Whether the arrangement switching of the multiplex bit(s) by the channel interleaver unit 4008 is performed may be given based on the signal waveform. For example, whether the arrangement switching of the multiplex bit(s) by the channel interleaver unit 4008 is performed may be given based on the signal waveform of the channel including the multiplex bit(s). For example, in a case that the signal waveform of the channel including the multiplex bit(s) is a prescribed signal waveform, the arrangement switching of the multiplex bit(s) may be performed by the channel interleaver unit 4008. Furthermore, in a case that the signal waveform of the channel including the multiplex bit(s) is not the prescribed signal waveform, the arrangement switching of the multiplex bit(s) may not be performed by the channel interleaver unit 4008. Here, for example, the prescribed signal waveform may be OFDM. Furthermore, the prescribed signal waveform may be DFT-s-OFDM.

Whether the arrangement switching of the multiplex bit(s) by the channel interleaver unit 4008 is performed may be given based on the error correcting code applied to the transport block including the multiplex bit(s) (e.g., the type of the error correcting code, the size of the check matrix, the generation method of the check matrix, the coding rate, presence/absence of the outer code and the like). For example, in a case that the error correcting code applied to the transport block including the multiplex bit(s) is a turbo code, the arrangement switching of the multiplex bit(s) may be performed by the channel interleaver unit 4008. Furthermore, in a case that the error correcting code applied to the transport block including the multiplex bit(s) is a code other than a turbo code, the arrangement switching of the multiplex bit(s) may not be performed by the channel interleaver unit 4008. Furthermore, in a case that the coding rate of the error correcting code applied to the transport block including the multiplex bit(s) is $1/3$, the arrangement switching of the multiplex bit(s) may be performed by the channel interleaver unit 4008. Furthermore, in a case that the coding rate of the error correcting code applied to the transport block including the multiplex bit(s) is not $1/3$, the arrangement switching of the multiplex bit(s) may not be performed by the channel interleaver unit 4008. Furthermore, in a case that the outer code is not applied to the transport block including the multiplex bit(s), the arrangement switching of the multiplex bit(s) may be performed by the channel interleaver unit 4008. Furthermore, in a case that the outer code is applied to the transport block including the multiplex bit(s), the arrangement switching of the multiplex bit(s) may not be performed by the channel interleaver unit 4008.

Whether the arrangement switching of the multiplex bit(s) by the channel interleaver unit 4008 is performed may be given based on the number of the CRC bit(s) added to the code block used for generation of the multiplex bit(s) and/or the transport block including the multiplex bit(s). For example, in a case that the CRC bit(s) added to the code block used for generation of the multiplex bit(s) and/or the transport block including the multiplex bit(s) is added, the arrangement switching of the multiplex bit(s) may be performed by the channel interleaver unit 4008. Furthermore, in a case that the CRC bit(s) added to the code block used for generation of the multiplex bit(s) and the transport block including the multiplex bit(s) is not added, the arrangement switching of the multiplex bit(s) may not be performed by the channel interleaver unit 4008. Furthermore, in a case that the CRC bit(s) added to the code block used for generation of the multiplex bit(s) and/or the transport block including the multiplex bit(s) is 24 bits, the arrangement switching of the multiplex bit(s) may be performed by the channel interleaver unit 4008. Furthermore, in a case that the CRC bit(s) added to the code block used for generation of the multiplex bit(s) and the transport block including the multiplex bit(s) is not 24 bits, the arrangement switching of the multiplex bit(s) may not be performed by the channel interleaver unit 4008.

For example, whether the arrangement switching of the multiplex bit(s) by the channel interleaver unit 4008 is performed may be given based on the duplex scheme for the serving cell. Furthermore, whether the arrangement switching of the multiplex bit(s) by the channel interleaver unit 4008 is performed may be given based on the duplex scheme applied to the serving cell for the channel including the transport block including the multiplex bit(s).

Here, the axis prioritized for the mapping in the arrangement switching of the multiplex bit(s) may be the time axis (Time first mapping). In other words, the first axis may be the time axis. Furthermore, the axis prioritized for the mapping in the arrangement switching of the coded bit(s) may be the frequency axis (Frequency first mapping). In other words, the second axis may be the frequency axis.

For example, the resource element mapper processing unit 3007 may perform a process of mapping the transmission bit(s) to the resource element. The resource element may correspond to the element disposed in the block $B_2$. Here, the block $B_2$ may be a subframe (or, a part of a subframe). Furthermore, the block $B_2$ may be a slot (or, a part of a slot). Furthermore, the block $B_2$ may correspond to one or more OFDM symbol(s). The resource element mapper processing unit 3007 may map the transmission bit(s) in the first-axis prioritized manner or the second axis prioritized manner. Here, the block $B_2$ is identical to the block B except for the number of columns and rows of the block $B_2$. At least one of the first axis and the second axis of the block $B_2$ may be the frequency axis. Furthermore, at least one of the first axis and the second axis of the block $B_2$ may be the time axis.

A process block having a function of mapping and/or acquiring information sequence (e.g., coded bit(s), multiplex bit(s), transmission bit(s) and the like) to the block B, the block $B_1$, and the block $B_2$ is also referred to as a mapping unit. The block B, the block $B_1$ and the block $B_2$ are collectively referred to as a mapping region.

The resource element mapper processing unit 3007 may apply frequency hopping to the mapping process of the transmission bit(s) to the resource element. The frequency hopping may be the slot hopping. The slot hopping may be a scheme in which radio signals of two slots included in one subframe are transmitted by respective frequencies.

Whether the frequency hopping is applied to the mapping process of the resource element may be based on information included in a higher layer signal. Whether the frequency hopping is applied to the mapping process of the resource element may be based on information included in a control channel. Whether the frequency hopping is applied to the mapping process of the resource element may be based on preliminarily configured information.

For example, whether the first axis or the second axis is prioritized by the resource element mapper processing unit 3007 in mapping of the transmission bit(s) may be given based on the transport block size. For example, in a case that the transport block size $N_{TBS}$ satisfies $N_{TBS} > Z_t$, the resource element mapper processing unit 3007 maps the transmission bit(s) in the first-axis prioritized manner. Furthermore, in a case that transport block size $N_{TBS}$ satisfies $N_{TBS} \leq Z_t$, the resource element mapper processing unit 3007 maps the transmission bit(s) in the second-axis prioritized manner. Here, the $Z_t$, $Z_1$ and $Z_2$ may be given based on information included in a higher layer signal. Here, the $Z_t$, $Z_1$ and $Z_2$ may be given based on information included in a control channel. Furthermore, $Z_t$, $Z_1$, $Z_2$ may be given based on information included in a control channel. Furthermore, whether the first axis or the second axis is prioritized by the resource element mapper processing unit 3007 in mapping of the transmission bit(s) may be given based on the transport block size and the modulation scheme (QPSK, 16 QAM, 64 QAM and the like). Here, "based on the transport block size and the modulation scheme" may be based on the ratio of the modulation order of the modulation scheme applied to the transport block and the transport block size (or, a value relating to the modulation symbol number). Furthermore, whether the first axis or the second axis is prioritized by the resource element mapper processing unit 3007 in mapping of the transmission bit(s) may be given based on the ratio of resource element number of the channel including the transport block included in the transmission bit(s) and the transport block size of the transport block included in the transmission bit(s). Here, the transport block size of the transport block may be represented by the sum of at least one code block size generated from the transport block. Furthermore, the ratio of the resource element number included in the channel including the transport block may be represented by a resource element number allocated to the terminal apparatus 1, the resource element number being given by the scheduling information (which may be a downlink grant in a case of downlink communication, and may be an uplink grant in a case of uplink communication). Here, a resource element number allocated to the terminal apparatus 1 may be given by the product of the allocated subcarrier number and the symbol number. Furthermore, a resource element number allocated to the terminal apparatus 1 may be given as a value obtained by subtracting the resource element included in a prescribed region from the product of the allocated subcarrier number and the symbol number. Here, the prescribed region may be a region including the reference signal channel. Furthermore, the prescribed region may be a region including the synchronization channel.

For example, whether the first axis or the second axis is prioritized by the resource element mapper processing unit 3007 in mapping of the transmission bit(s) may be given based on the component carrier (or, the serving cell, the bandwidth of the serving cell and the like). For example, whether the first axis or the second axis is prioritized by the resource element mapper processing unit 3007 in mapping of the transmission bit(s) may be given based on the component carrier for the channel including the transmission bit(s). Whether the first axis or the second axis is prioritized by the resource element mapper processing unit 3007 in mapping of the transmission bit(s) may be given based on whether the cell for the channel including the transmission bit(s) is the primary cell or the secondary cell. Here, the primary cell may include the primary secondary cell. Furthermore, the secondary cell may include the primary secondary cell. Furthermore, for example, whether the first axis or the second axis is prioritized by the resource element mapper processing unit 3007 in mapping of the transmission bit(s) may be given based on whether the cell for the channel including the transmission bit(s) is the primary secondary cell. Whether the first axis or the second axis is prioritized by the resource element mapper processing unit 3007 in mapping of the transmission bit(s) may be given based on whether the serving cell for the channel including the transmission bit(s) is included in the SCG or the MCG. Whether the first axis or the second axis is prioritized by the resource element mapper processing unit 3007 in mapping of the transmission bit(s) may be given based on whether the serving cell for the channel including the transmission bit(s) is a licensed band or an unlicensed band.

Whether the first axis or the second axis is prioritized by the resource element mapper processing unit 3007 in mapping of the transmission bit(s) may be given based on the ID of the serving cell. Whether the first axis or the second axis is prioritized by the resource element mapper processing unit 3007 in mapping of the transmission bit(s) may be given based on the ID of the serving cell for the channel including the transmission bit(s).

Whether the first axis or the second axis is prioritized by the resource element mapper processing unit 3007 in mapping of the transmission bit(s) may be given based on whether the frequency hopping is applied to the channel including the transmission bit(s). For example, in a case that the frequency hopping is applied to the channel including the transmission bit(s), the resource element mapper processing unit 3007 may map the transmission bit(s) in the first-axis prioritized manner. Furthermore, in a case that the frequency hopping is not applied to the channel including the transport block, the resource element mapper processing unit 3007 may map the transmission bit(s) in the second-axis prioritized manner.

Whether the first axis or the second axis is prioritized by the resource element mapper processing unit 3007 in mapping of the transmission bit(s) may be given based on the subcarrier interval. For example, whether the first axis or the second axis is prioritized by the resource element mapper processing unit 3007 in mapping of the transmission bit(s) may be given based on the subcarrier interval for the channel including the transmission bit(s). Furthermore, in a case that the subcarrier interval for the channel including the transmission bit(s) is 15 kHz, the resource element mapper processing unit 3007 may map the transmission bit(s) in the first-axis prioritized manner. Furthermore, in a case that the subcarrier interval for the channel including the transmission bit(s) is not 15 kHz, the resource element mapper processing unit 3007 may map the transmission bit(s) in the second-axis prioritized manner.

Whether the first axis or the second axis is prioritized by the resource element mapper processing unit 3007 in mapping of the transmission bit(s) may be given based on the TTI length (or the symbol number) for the channel including the transmission bit(s). For example, in a case that the TTI length for the channel including the transmission bit(s) is smaller than 1 ms, the resource element mapper processing unit 3007 may map the transmission bit(s) in the first-axis prioritized manner. Furthermore, in a case that the TTI length for the channel including the transmission bit(s) is greater than 1 ms, the resource element mapper processing unit 3007 may map the transmission bit(s) in the second-axis prioritized manner. Furthermore, whether the first axis or the second axis is prioritized by the resource element mapper processing unit 3007 in mapping of the transmission bit(s) may be given based on whether the symbol number for the channel including the transmission bit(s) is 14. For example, in a case that the symbol number of the channel including the transmission bit(s) is smaller than 14, the resource element mapper processing unit 3007 may map the transmission bit(s) in the first-axis prioritized manner. Furthermore, in a case that the symbol number of the channel including the transmission bit(s) is greater than 14, the resource element mapper processing unit 3007 may map the transmission bit(s) in the second-axis prioritized manner.

Whether the first axis or the second axis is prioritized by the resource element mapper processing unit 3007 in mapping of the transmission bit(s) may be given based on the signal waveform. For example, whether the first axis or the second axis is prioritized by the resource element mapper processing unit 3007 in mapping of the transmission bit(s) may be given based on the signal waveform of the channel including the transmission bit(s). For example, in a case that the signal waveform of the channel including the transmission bit(s) is a prescribed signal waveform, the resource element mapper processing unit 3007 may map the transmission bit(s) in the first-axis prioritized manner. Furthermore, in a case that the signal waveform of the channel including the coded bit(s) is a waveform other than the prescribed signal waveform, the resource element mapper processing unit 3007 may map the transmission bit(s) in the second-axis prioritized manner. Here, for example, the prescribed signal waveform may be OFDM. Furthermore, the prescribed signal waveform may be DFT-s-OFDM.

Whether the first axis or the second axis is prioritized by the resource element mapper processing unit 3007 in mapping of the transmission bit(s) may be given based on the error correcting code (e.g., the type of the error correcting code, the size of the check matrix, the generation method of the check matrix, the coding rate, presence/absence of the outer code and the like) applied to the transport block included in the transmission bit(s). For example, in a case that the error correcting code applied to the transport block included in the transmission is a turbo code, the resource element mapper processing unit 3007 may map the transmission bit(s) in the first-axis prioritized manner. Furthermore, in a case that the error correcting code applied to the transport block included in the transmission bit(s) is a code other than the turbo code, the resource element mapper processing unit 3007 may map the transmission bit(s) in the second-axis prioritized manner. Furthermore, in a case that the coding rate of the error correcting code applied to the transport block included in the transmission bit(s) is ⅓, the resource element mapper processing unit 3007 may map the transmission bit(s) in the first-axis prioritized manner. Furthermore, in a case that the coding rate of the error correcting code applied to the transport block included in the transmission bit(s) is not ⅓, the resource element mapper processing unit 3007 may map the transmission bit(s) in the second-axis prioritized manner. Furthermore, in a case that the outer code is not applied to the transport block included in the transmission bit(s), the resource element mapper processing unit 3007 may map the transmission bit(s) in the first-axis prioritized manner. Furthermore, in a case that the outer code is applied to the transport block included in the transmission bit(s), the resource element mapper processing unit 3007 may map the transmission bit(s) in the second-axis prioritized manner.

Whether the first axis or the second axis is prioritized by the resource element mapper processing unit 3007 in mapping of the transmission bit(s) may be given based on the number of the CRC bit(s) added to the code block included in the transmission bit(s) and/or the transport block included in the transmission bit(s). For example, in a case that the CRC bit(s) added to the code block included in the transmission bit(s) and/or the transport block included in the transmission bit(s) is added, the resource element mapper processing unit 3007 may map the transmission bit(s) in the first-axis prioritized manner. Furthermore, in a case that the CRC bit(s) added to the code block included in the transmission bit(s) and the transport block included in the transmission bit(s) is not added, the resource element mapper processing unit 3007 may map the transmission bit(s) in the second-axis prioritized manner. Furthermore, in a case that the CRC bit(s) added to the code block included in the transmission bit(s) and/or the transport block included in the transmission bit(s) is 24 bits, the resource element mapper processing unit 3007 may map the transmission bit(s) in the first-axis prioritized manner. Furthermore, in a case that the CRC bit(s) added to the code block included in the transmission bit(s) and the transport block included in the transmission bit(s) is not 24 bits, the resource element mapper processing unit 3007 may map the transmission bit(s) in the second-axis prioritized manner.

For example, whether the first axis or the second axis is prioritized by the resource element mapper processing unit 3007 in mapping of the transmission bit(s) may be given based on the duplex scheme for the serving cell. Furthermore, whether the first axis or the second axis is prioritized by the resource element mapper processing unit 3007 in mapping of the transmission bit(s) may be given based on the duplex scheme applied to the serving cell for the channel including the transport block included in the transmission bit(s).

Here, for example, the first axis may be the time axis, and the second axis may be the frequency axis. Furthermore, the first axis may be the frequency axis, and the second axis may be the time axis.

A procedure of the terminal apparatus 1 and the base station apparatus 3 according to one aspect of the present invention is described below.

The terminal apparatus 1 and the base station apparatus 3 may include a transmission process. The transmission process may include at least one process of a transmitter 107 or a transmitter 307.

The terminal apparatus 1 and the base station apparatus 3 may include a reception process. The reception process may include at least one process of a receiver 105 or a receiver 305.

The terminal apparatus 1 including the transmission process and the base station apparatus 3 including the transmission process are also collectively referred to as a transmission apparatus 8. The terminal apparatus 1 including the reception process and the base station apparatus 3 including the reception process are also collectively referred to as a reception apparatus 9. Here, the terminal apparatus 1 may be the transmission apparatus 8 and/or the reception apparatus 9. Furthermore, the base station apparatus 3 may be the transmission apparatus 8 and/or the reception apparatus 9.

The transmission apparatus 8 may switch the setting of the mapping method and/or setting of the code block length of the transport block, based on at least one of the length of the symbol(s), the signal waveform, the scheme of the error correcting code, and the component carrier. The reception apparatus 9 may assume that the setting of the code block length relating to the received transport block and/or the setting of the mapping method is switched, based on at least one of the length of the symbol(s), the signal waveform, the scheme of the error correcting code, and the component carrier.

The setting of the code block length may be any of the code block length and the maximum code block length Z.

The setting of the mapping method may be any of the sub-block interleaver, the channel interleaver, and the setting of the resource element mapping.

The length of the symbol(s) may be any of the subcarrier interval (or, the single carrier, the bandwidth), and the symbol number (or Transmission Time Interval (TTI) length or the like).

The signal waveform may be a type of a Waveform. The waveform may be the OFDM, the DFT-s-OFDM, the frequency hopping and the like, for example.

The scheme of the error correcting code may be specified by the type of the check matrix. The scheme of the error correcting code may be specified by the presence/absence of the CRC bit(s), or the length of the CRC bit(s).

The component may be specified by any of the carrier serving cell, the physical cell ID, the ScellIndex, and the ServCellIndex.

The length of the symbol(s), the signal waveform, the scheme of the error correcting code, and the configuration information relating to the component carrier may be included in the control channel. The terminal apparatus 1 may switch the setting of the code block length and/or the setting of the mapping method, based on the length of the symbol(s), the signal waveform, the scheme of the error correcting code, and the configuration information relating to the component carrier included in the control channel transmitted from the base station apparatus 3.

The length of the symbol(s), the signal waveform, the scheme of the error correcting code, and the configuration information relating to the component carrier may be included in the higher layer signal. The terminal apparatus 1 may switch the setting of the code block length and/or the setting of the mapping method, based on the length of the symbol(s), the signal waveform, the scheme of the error correcting code, and the configuration information relating to the component carrier included in the higher layer signal transmitted from the base station apparatus 3.

An apparatus configuration of the terminal apparatus 1 according to the present invention is described below.

Figure 10:
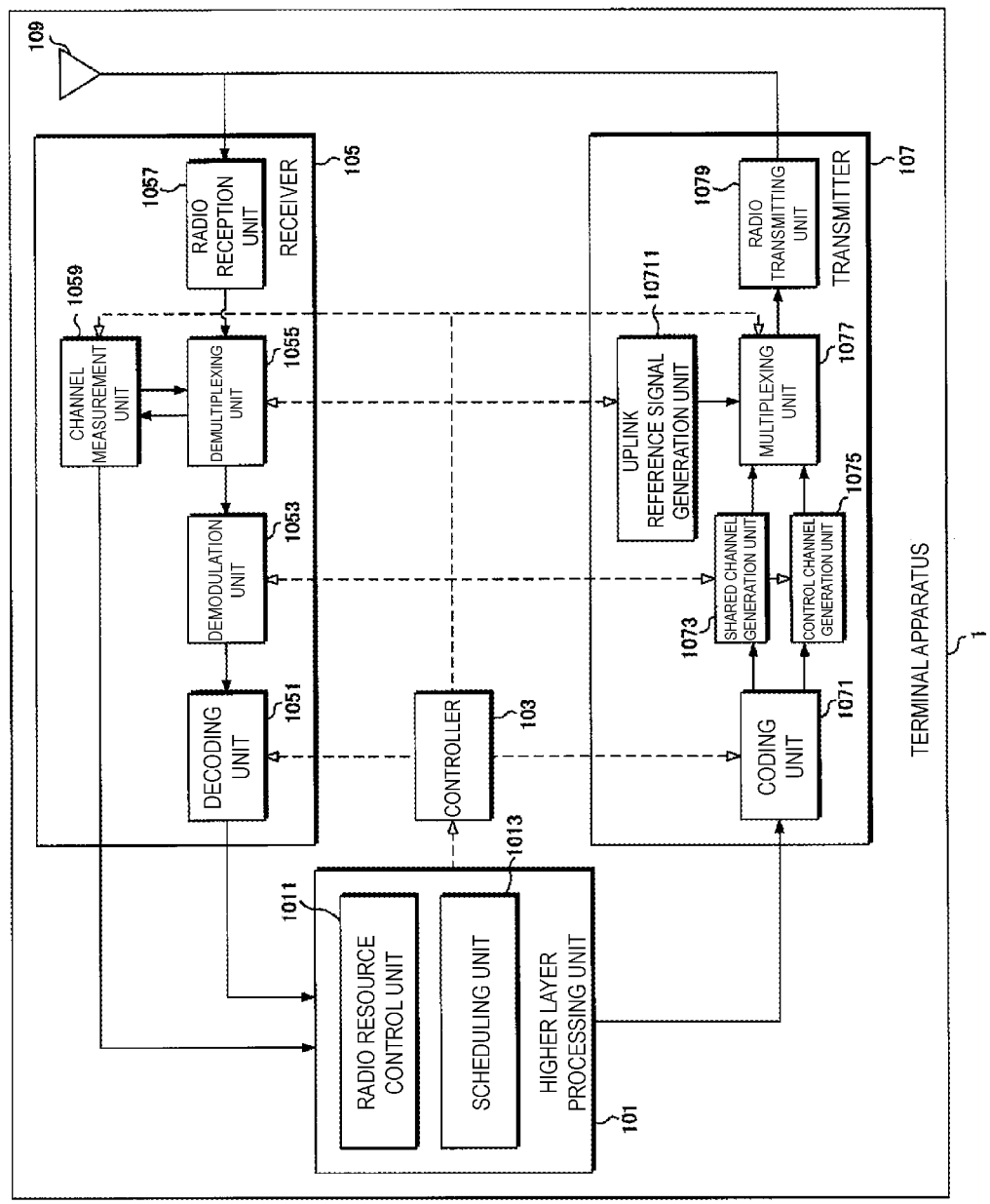
FIG. 10 is a schematic block diagram illustrating a configuration of a terminal apparatus 1 according to the present embodiment.

FIG. 10 is a schematic block diagram illustrating a configuration of a terminal apparatus 1 according to the present embodiment. As illustrated in the diagram, the terminal apparatus 1 includes at least one of a higher layer processing unit 101, a controller 103, the receiver 105, the transmitter 107 and a transmit and receive antenna 109. The higher layer processing unit 101 includes at least one of a radio resource control unit 1011, and a scheduling unit 1013. The receiver 105 includes at least one of a decoding unit 1051, a demodulation unit 1053, a demultiplexing unit 1055, a radio receiving unit 1057 and a channel measurement unit 1059. The transmitter 107 includes at least one of a coding unit 1071, a shared channel generation unit 1073, a control channel generation unit 1075, a multiplexing unit 1077, a radio transmitting unit 1079 and an uplink reference signal generation unit 10711.

The higher layer processing unit 101 outputs uplink data generated by a user operation and the like to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 101 generates control information for controlling the receiver 105 and the transmitter 107, based on downlink control information received by the control channel and the like, and outputs the information to the controller 103.

The radio resource control unit 1011 of the higher layer processing unit 101 manages various pieces of configuration information of the terminal apparatus 1 itself. For example, the radio resource control unit 1011 manages the set serving cell. Furthermore, the radio resource control unit 1011 generates information to be mapped to each uplink channel, and outputs the generated information to the transmitter 107. In a case that decoding of the received downlink data is successfully performed, the radio resource control unit 1011 generates ACK and outputs the ACK to the transmitter 107, whereas in a case that decoding of the received downlink data is failed, the radio resource control unit 1011 generates NACK and outputs the NACK to the transmitter 107.

The scheduling unit 1013 of the higher layer processing unit 101 stores received downlink control information via the receiver 105. The scheduling unit 1013 controls the transmitter 107 via the controller 103 so as to transmit the PUSCH in accordance with the received uplink grant in a fourth subframe from the subframe of the received uplink grant. The scheduling unit 1013 controls the receiver 105 via the controller 103 so as to receive a shared channel in accordance with the received downlink grant in the subframe of the received downlink grant.

In accordance with the control information originating from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 via the transmit and receive antenna 109, and outputs the resulting information to the higher layer processing unit 101.

The radio receiving unit 1057 performs orthogonal demodulation of a downlink signal received via the transmit and receive antenna 109, and converts the orthogonal demodulated analog signal to a digital signal. For example, the radio receiving unit 1057 may perform Fast Fourier Transform (FFT) on the digital signal, and extract a signal in the frequency domain.

The demultiplexing unit 1055 separates the extracted signal into a control channel, a shared channel, and a reference signal channel. The demultiplexing unit 1055 outputs the separated reference signal channel to the channel measurement unit 1059.

The demodulation unit 1053 performs demodulation for a modulation scheme such as the QPSK, the 16 Quadrature Amplitude Modulation (QAM) and the 64 QAM on the control channel and the shared channel, and outputs the decoded data to the decoding unit 1051.

The decoding unit 1051 performs decoding of downlink data, and outputs the decoded downlink data to the higher layer processing unit 101. The channel measurement unit 1059 calculates an estimation value of a downlink channel from reference signal channel, and outputs the result to the demultiplexing unit 1055. The channel measurement unit 1059 calculates channel state information, and outputs the channel state information to the higher layer processing unit 101.

The transmitter 107 generates an uplink reference signal channel in accordance with the control signal input from the controller 103, codes and modulates the uplink data and/or the uplink control information input from the higher layer processing unit 101, multiplexes the shared channel, the control channel, and the reference signal channel, and transmits a result of the multiplexing to the base station apparatus 3 via the transmit and receive antenna 109.

The coding unit 1071 codes the uplink control information and the uplink data input from the higher layer processing unit 101 and outputs the coded bit(s) to the shared channel generation unit 1073 and/or the control channel generation unit 1075.

The shared channel generation unit 1073 may generate modulation symbol(s) by modulating the coded bit(s) input from the coding unit 1071, generate a shared channel by performing DFT on the modulation symbol(s), and output the result to the multiplexing unit 1077. The shared channel generation unit 1073 may generate a shared channel by modulating the coded bit(s) input from the coding unit 1071, and output the result to the multiplexing unit 1077.

The control channel generation unit 1075 generates a control channel in accordance with the SR and/or the coded bit(s) input from the coding unit 1071, and output the result to the multiplexing unit 1077.

The uplink reference signal generation unit 10711 generates an uplink reference signal and outputs the generated uplink reference signal to the multiplexing unit 1077.

In accordance with the control signal input from the controller 103, the multiplexing unit 1077 multiplexes, to the uplink resource element for each transmit antenna port, the signal input from the shared channel generation unit 1073 and/or the signal input from the control channel generation unit 1075, and/or the uplink reference signal input from the uplink reference signal generation unit 10711.

The radio transmitting unit 1079 performs Inverse Fast Fourier Transform (IFFT) on the multiplexed signal, generates a baseband digital signal, converts the baseband digital signal into an analog signal, generates an in-phase component and a quadrature component of an intermediate frequency from the analog signal, removes a frequency component unnecessary for the intermediate frequency band, converts (up converts) the intermediate frequency signal into a high frequency signal, removes the unnecessary frequency component, and amplifies the power, and outputs and transmits it to the transmit and receive antenna 109.

An apparatus configuration of the base station apparatus 3 according to the present invention is described below.

Figure 11:
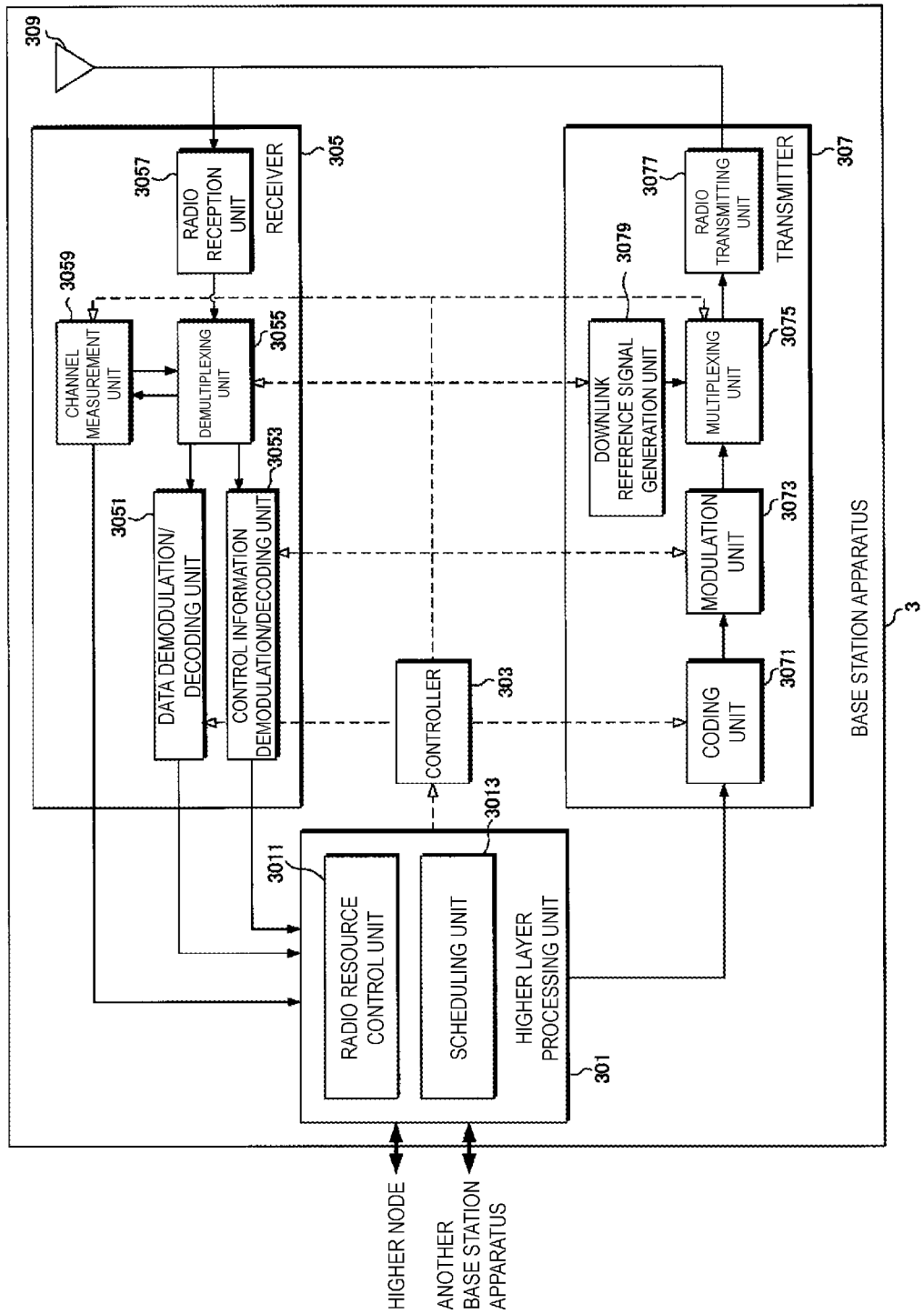
FIG. 11 a schematic block diagram illustrating a configuration of a base station apparatus 3 according to the present embodiment.

FIG. 11 is a schematic block diagram illustrating a configuration of a base station apparatus 3 according to the present embodiment. As illustrated in the figure, the base station apparatus 3 is configured to include a higher layer processing unit 301, a control unit 303, a reception unit 305, a transmission unit 307, and a transmit and receive antenna 309. The higher layer processing unit 301 includes a radio resource control unit 3011 and a scheduling unit 3013. The receiver 305 is configured to include a data demodulation/decoding unit 3051, a control information demodulation/decoding unit 3053, a demultiplexing unit 3055, a radio receiving unit 3057 and a channel measurement unit 3059. The transmitter 307 is configured to include a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 of the higher layer processing unit 301 generates, or acquires from the higher node, RRC signaling, MAC Control Element (CE) and downlink data allocated in the downlink shared channel, outputs the data to the HARQ control unit 3013. Furthermore, the radio resource control unit 3011 manages various configuration information for each of the terminal apparatuses 1. For example, the radio resource control unit 3011 manages the serving cell configured in the terminal apparatus 1 and the like.

The scheduling unit 3013 of the higher layer processing unit 301 manages the radio resource of the control channel and/or the shared channel to be allocated to the terminal apparatus 1. In a case that the radio resource of the shared channel is allocated to the terminal apparatus 1, the scheduling unit 3013 generates an uplink grant indicating allocation of the radio resource of the shared channel, and outputs the generated uplink grant to the transmitter 307.

Based on the control information originating from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 performs orthogonal demodulation on the uplink signal received via the transmit and receive antenna 309, and converts the orthogonal demodulated analog signal into a digital signal. The radio receiving unit 3057 performs Fast Fourier Transform (FFT) on the digital signal, extracts a signal in the frequency domain, outputs the signal to the demultiplexing unit 3055.

The demultiplexing unit 1055 separates the signal input from the radio receiving unit 3057 into signals of a control channel, a shared channel, a reference signal channel, and the like. The demultiplexing is performed based on radio resource allocation information that is determined in advance by the base station apparatus 3 using the radio resource control unit 3011 and that is included in the uplink grant notified to each of the terminal apparatuses 1. The demultiplexing unit 3055 makes a compensation of channels of the control channel and the shared channel from the estimation value of the channel input from the channel measurement unit 3059. Furthermore, the demultiplexing unit 3055 outputs the separated reference signal channel to the channel measurement unit 3059.

The demultiplexing unit 3055 acquires uplink data modulation symbol(s) and modulation symbol(s) of uplink control information (HARQ-ACK) from the separated control channel and the shared channel. The demultiplexing unit 3055 outputs the uplink data modulation symbol(s) acquired from the signal of the shared channel to the data demodulation/decoding unit 3051. The demultiplexing unit 3055 outputs the modulation symbol(s) of the uplink control information (HARQ-ACK) acquired from the control channel or the shared channel to the control information demodulation/decoding unit 3053.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation/decoding unit 3051 decodes uplink data from the modulation symbol(s) of the uplink data input from the demultiplexing unit 3055. The data demodulation/decoding unit 3051 outputs the decoded uplink data to the higher layer processing unit 301.

The control information demodulation/decoding unit 3053 decodes a HARQ-ACK from HARQ-ACK modulation symbol(s) input from the demultiplexing unit 3055. The control information demodulation/decoding unit 3053 outputs the decoded HARQ-ACK to the higher layer processing unit 301.

In accordance with the control signal input from the controller 303, the transmitter 307 generates downlink reference signal, codes and modulates downlink data and the downlink control information input from the higher layer processing unit 301, multiplexes the control channel, the shared channel and the reference signal channel, and transmits the signal to the terminal apparatus 1 via the transmit and receive antenna 309.

The coding unit 3071 codes the downlink data and the downlink control information input from the higher layer processing unit 301. The modulation unit 3073 modulates the coded bit(s) input from the coding unit 3071, in compliance with the modulation scheme such as BPSK, QPSK, 16 QAM, or 64 QAM. The modulation unit 3073 may apply precoding to the modulation symbol(s). The precoding may include a transmission precode. Note that the precoding may be multiplication (application) of a precoder.

The downlink reference signal generation unit 3079 generates a downlink reference signal. The multiplexing unit 3075 multiplexes the downlink reference signal and the modulation symbol(s) of each channel, and generates transmission symbol(s).

The multiplexing unit 3075 may apply precoding to the transmission symbol(s). The precoding applied to the transmission symbol(s) by the multiplexing unit 3075 may be applied to the downlink reference signal and/or the modulation symbol(s). Furthermore, the precoding applied to the downlink reference signal and the precoding applied to modulation symbol(s) may be identical to each other or different from each other.

The radio transmitting unit 3077 performs Inverse Fast Fourier Transform (IFFT) on the multiplexed transmission symbol(s) and the like, and generates time symbol(s). The radio transmitting unit 3077 performs OFDM modulation on the time symbol(s), generates a baseband digital signal, converts the baseband digital signal into an analog signal, generates a quadrature component and an in-phase component of intermediate frequency from the analog signal, removes the frequency component unnecessary for the intermediate frequency band, converts (up converts) the signal of the intermediate frequency into a high frequency signal, removes the unnecessary frequency component, and generates a Carrier signal (Carrier, RF signal and the like). The radio transmitting unit 3077 performs power amplification on the carrier signal, and outputs the result to the transmit and receive antenna 309 for transmission.

(1) To accomplish the object described above, aspects of the present invention are contrived to provide the following measures. Specifically, the transmission apparatus 8 according to a first aspect of the present invention includes a coding unit configured to divide a transport block into multiple code blocks and code the code block, and a transmitter configured to transmit a channel including the code block, in which the length of the code block is given based on at least one of a first element, a second element, a third element, and a fourth element, the first element is a length of the symbol(s) of the channel, the second element is a signal waveform of the channel, the third element is a scheme of the error correction coding applied to the code block, and the fourth element is the setting of the component carrier of the channel.

(2) Furthermore, in the first aspect of the present invention, the length of the code block is given based on the maximum code block for the transport block given based on at least one of the first element, the second element, the third element, and the fourth element.

(3) Furthermore, the reception apparatus 9 according to a second aspect of the present invention includes a receiver configured to receive a channel including multiple code blocks generated by dividing one transport block, and a decoding unit configured to decode the multiple code blocks, in which the length of the code block is given based on at least one of the first element, the second element, the third element, and the fourth element, the first element is a length of the symbol(s) of the channel, the second element is a signal waveform of the channel, the third element is a scheme of the error correction coding applied to the code block, and the fourth element is the setting of the component carrier of the channel.

(4) Furthermore, in the second aspect of the present invention, the length of the code block is given based on the maximum code block for the transport block given based on at least one of the first element, the second element, the third element, and the fourth element.

(5) Furthermore, the transmission apparatus 8 according to a third aspect of the present invention includes a coding unit configured to generate coded bit(s) by coding a transport block, and configured to transmit the channel including the coded bit(s) to a transmitter, in which mapping of the coded bit(s) is given based on at least one of the first element, the second element, the third element, and the fourth element, the first element is a length of the symbol(s) of the channel, the second element is a signal waveform of the channel, the third element is a scheme of the error correction coding applied to the transport block, and the fourth element is the setting of the component carrier of the channel.

(6) Furthermore, in the third aspect of the present invention, the mapping is subblock interleave, and whether the arrangement switching of the coded bit(s) is performed is given based on at least one of the first element, the second element, the third element, and the fourth element.

(7) Furthermore, in the third aspect of the present invention, the mapping is channel interleave, and whether the arrangement switching of the multiplex bit(s) generated based on the coded bit(s) is performed is given based on at least one of the first element, the second element, the third element, and the fourth element.

(8) Furthermore, in the third aspect of the present invention, the mapping is a resource element mapping process, and whether the transmission bit(s) generated based on the coded bit(s) is mapped in a time-axis prioritized manner (Time first mapping) or a frequency-axis prioritized manner (Frequency first mapping) is given based on at least one of the first element, the second element, the third element, and the fourth element.

(9) Furthermore, the reception apparatus 9 of a fourth aspect of the present invention includes a receiver configured to receive the channel including the coded bit(s) generated by coding of a transport block, and a decoding unit configured to decode the coded bit(s), in which mapping of the coded bit(s) is given based on at least one of the first element, the second element, the third element, and the fourth element, the first element is a length of the symbol(s) of the channel, the second element is a signal waveform of the channel, the third element is a scheme of the error correction coding applied to the transport block, and the fourth element is the setting of the component carrier of the channel.

(10) Furthermore, in the fourth aspect of the present invention, the mapping is subblock interleave, and whether the arrangement switching of the coded bit(s) is performed is given based on at least one of the first element, the second element, the third element, and the fourth element.

(11) Furthermore, in the fourth aspect of the present invention, the mapping is channel interleave, and whether the arrangement switching of the multiplex bit(s) generated based on the coded bit(s) is performed is given based on at least one of the first element, the second element, the third element, and the fourth element.

(12) Furthermore, in the fourth aspect of the present invention, the mapping is resource element mapping process, and whether the transmission bit(s) generated based on the coded bit(s) is mapped in a time-axis prioritized manner mapped (Time first mapping) or a frequency-axis prioritized manner (Frequency first mapping) is given based on at least one of the first element, the second element, the third element, and the fourth element.

Here, in the first to fourth aspects, the symbol may be an OFDM symbol, a DFT-S-OFDM symbol, or an SC-FDMA symbol. Furthermore, the symbol may be given based on the subcarrier interval.

(1A) An aspect of the present invention is a terminal apparatus including: a coding unit configured to divide a transport block into one or more code blocks and generate coded bit(s) by coding the one or more code blocks; and a transmitter configured to transmit the coded bit(s) by using a channel. Multiplex bit(s) are given based on at least coupling of the coded bit(s) generated by coding of the one or more code blocks, the coding unit maps the multiplex bit(s) to a matrix in a first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(2A) An aspect of the present invention is a terminal apparatus including: a coding unit configured to divide a transport block into one or more code blocks and generate coded bit(s) by coding the one or more code blocks; and a transmitter configured to map transmission symbol(s) to a prescribed channel and transmit the channel. The transmission symbol(s) are given based on at least modulation of a sequence in which the coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(3A) An aspect of the present invention is a base station apparatus including: a receiver configured to receive a channel; and a decoding unit configured to decode one or more code blocks transmitted using the channel. Multiplex bit(s) are given based on at least coupling of coded bit(s)

generated by coding of the one or more code blocks, the decoding unit maps the multiplex bit(s) to a matrix in the first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(4A) An aspect of the present invention is a base station apparatus including: a receiver configured to receive a channel including transmission symbol(s); and a decoding unit configured to decode one or more code blocks transmitted using the channel. The transmission symbol(s) are given based on at least modulation of a sequence in which coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(5A) An aspect of the present invention is a communication method used by a terminal apparatus, the communication method including the steps of: dividing a transport block into one or more code blocks and generating coded bit(s) by coding the one or more code blocks; and transmitting the coded bit(s) by using a channel. Multiplex bit(s) are given based on at least coupling of the coded bit(s) generated by coding of the one or more code blocks, the coding unit maps the multiplex bit(s) to a matrix in the first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(6A) An aspect of the present invention is a communication method used by a terminal apparatus, the communication method including the steps of: dividing a transport block into one or more code blocks and generating coded bit(s) by coding the one or more code blocks; and mapping transmission symbol(s) to a prescribed channel and transmitting the channel. The transmission symbol(s) are given based on at least modulation of a sequence in which the coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(7A) An aspect of the present invention is a communication method used by a base station apparatus, the communication method including the steps of: receiving a channel; and decoding one or more code blocks transmitted using the channel. Multiplex bit(s) are given based on at least coupling of coded bit(s) generated by coding of the one or more code blocks, the decoding unit maps the multiplex bit(s) to a matrix in the first-axis prioritized manner and reads the multiplex bit(s) from the matrix in the first-axis prioritized manner or in a second-axis prioritized manner, and whether the first axis or the second axis is prioritized in a case that the multiplex bit(s) are read from the matrix is given based on at least whether a signal waveform applied to a prescribed channel is an OFDM.

(8A) An aspect of the present invention is a communication method used by a base station apparatus, the communication method including the steps of: receiving a channel including transmission symbol(s); and decoding one or more code blocks transmitted using the channel. The transmission symbol(s) are given based on at least modulation of a sequence in which coded bit(s) generated by coding of the one or more code blocks are coupled, and whether the transmission symbol(s) are mapped in a time-axis prioritized manner or a frequency-axis prioritized manner is given based on at least whether a signal waveform applied to the channel is an OFDM.

(9A) In an aspect of the present invention, whether the signal waveform applied to the channel is the OFDM is given based on at least a signal of a higher layer.

Each of a program running on a terminal apparatus 1, a base station apparatus 3, a transmission apparatus 8, and a reception apparatus 9 according to one aspect of the present invention may be a program that controls a Central Processing Unit (CPU) and the like, such that the program causes a computer to operate in such a manner as to realize the functions of the above-described embodiment according to one aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1, the base station apparatus 3, the transmission apparatus 8, or the reception apparatus 9 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1, the base station apparatus 3, the transmission apparatus 8, or the reception apparatus 9 and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the terminal apparatus 1, the base station apparatus 3, the transmission apparatus 8, or the reception apparatus 9 according to the above-described embodiment may be achieved as an aggregation (an apparatus group) constituted of multiple apparatuses. Each of the apparatuses configuring such an apparatus group may include at least one of respective functions or respective functional blocks of the terminal apparatus 1, the base station apparatus 3, the transmission apparatus 8, or the reception apparatus 9 according to the above-described embodiment. The apparatus group may include each general function or each functional block of the terminal apparatus 1, the base station apparatus 3, the transmission apparatus 8, or the reception apparatus 9. Furthermore, the terminal apparatus 1, the base station apparatus 3, the transmission apparatus 8, or the reception apparatus 9 according to the above-described embodiment can also communicate with the base station apparatus as the aggregation.

Furthermore, the base station apparatus 3, the transmission apparatus 8, or the reception apparatus 9 according to the above-described embodiment may serve as an Evolved Universal Terrestrial Radio Access Network (EUTRAN). Furthermore, the base station apparatus 3, the transmission apparatus 8, or the reception apparatus 9 according to the above-described embodiment may have at least one of the functions of a node higher than an eNodeB.

Furthermore, some or all portions of each of the terminal apparatus 1, the base station apparatus 3, the transmission apparatus 8, or the reception apparatus 9 according to the above-described embodiment may be typically achieved as an LSI which is an integrated circuit or may be achieved as a chip set. The functional blocks of each of the terminal apparatus 1, the base station apparatus 3, the transmission apparatus 8, or the reception apparatus 9 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine. The above-mentioned electric circuits may be constituted of a digital circuit, or may be constituted of an analog circuit. Furthermore, in a case that with advances in semiconductor technology, a circuit integration technology appears that replaces the present integrated circuits, one or more aspects of the present invention can use a new integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiment and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

One aspect of the present invention can be used for communication systems, communication apparatuses (e.g., mobile phone apparatuses, base station apparatuses, wireless LAN apparatuses, and sensor devices), integrated circuits (e.g., communication chips), programs and the like.

REFERENCE SIGNS LIST

1 (1A, 1B, 1C) Terminal apparatus
3 (3A, 3B) Base station apparatus
8 Transmission apparatus
9 Reception apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit
303 Controller
305 Receiver
307 Transmitter
309 Transmit and receive antenna
3000 Transmission process
3001 Coding processing unit
3002 scrambling processing unit
3003 Modulation mapper processing unit
3004 Layer mapper processing unit
3005 Transmission precoder processing unit
3006 Precoder processing unit
3007 Resource element mapper processing unit
3008 Baseband signal generation processing unit
3011 Radio resource control unit
3013 Scheduling unit
3051 Data demodulation/decoding unit
3053 Control information demodulation/decoding unit
3055 Demultiplexing unit
3057 Radio receiving unit
3059 Channel measurement unit
3071 Coding unit
3073 Modulation unit 3075 Multiplexing unit
3077 Radio transmitting unit
3079 Downlink reference signal generation unit
401 Segmentation and CRC unit
4001 CRC attachment unit
4002 Coding unit
4003 Sub-block interleaver unit
4004 Bit collection unit
4005 Bit selection and pruning unit
4006 Concatenation unit
4007 Control information and data multiplexing unit
4008 Channel interleaver unit
4011 Code block segmentation unit
4012 CRC attachment unit

The invention claimed is:

1. A transmission apparatus comprising:
code block segmentation circuitry configured to output one or more code block(s) with a first size based on an input of a transport block with a Cyclic Redundancy Check (CRC), and
encoding circuitry configured to generate encoded bits by applying Low Density Parity Check (LDPC) coding for each of the one or more code block(s), wherein
the transport block with the CRC is segmented into the one or more code block(s) in a case that a second size of the transport block with the CRC is larger than a third size,
the third size is given based on a generation method for a matrix for the LDPC coding,
the third size is a first value in a case that a first matrix for the LDPC coding is generated based on a first generation method, and
the third size is a second value which is different from the first value in a case that a second matrix for the LDPC coding is generated based on a second generation method.

2. The transmission apparatus according to claim 1, wherein a second CRC is added to the one or more code block(s) in a case that a number of the code block(s) is larger than 1.

3. The transmission apparatus according to claim 1, wherein the encoded bits are generated based on the matrix for the LDPC coding.

4. The transmission apparatus according to claim 1, wherein the encoded bits are generated based on an equation that the matrix for the LDPC coding multiplied by a second matrix equals to 0.

5. A method for a transmission apparatus, the method comprising:
outputting one or more code block(s) with a first size based on an input of a transport block with a Cyclic Redundancy Check (CRC), and
generating encoded bits by applying Low Density Parity Check (LDPC) coding for each of the one or more code block(s), wherein
the transport block with the CRC is segmented into the one or more code block(s) in a case that a second size of the transport block with the CRC is larger than a third size,
the third size is given based on a generation method for a matrix for the LDPC coding,
the third size is a first value in a case that a first matrix for the LDPC coding is generated based on a first generation method, and
the third size is a second value which is different from the first value in a case that a second matrix for the LDPC coding is generated based on a second generation method.

6. The transmission apparatus according to claim 1, wherein
whether the first matrix for the LDPC coding is generated based on the first generation method or the second matrix for the LDPC coding is generated based on the second generation method is based on information in a Physical Downlink Control Channel (PDCCH).

7. A reception apparatus comprising:
decoding circuitry configured to decode encoded bits into one or more code block(s) with a first size, which Low Density Parity Check (LDPC) coding is applied to, and to output a transport block with a Cyclic Redundancy Check (CRC), wherein
the transport block with the CRC is segmented into the one or more code block(s) in a case that a second size of the transport block with the CRC is larger than a third size,
the third size is given based on a generation method for a matrix for the LDPC coding,
the third size is a first value in a case that a first matrix for the LDPC coding is generated based on a first generation method, and
the third size is a second value which is different from the first value in a case that a second matrix for the LDPC coding is generated based on a second generation method.

8. The reception apparatus according to claim 7, wherein a second CRC is added to the one or more code block(s) in a case that a number of the code block(s) is larger than 1.

9. The reception apparatus according to claim 7, wherein the encoded bits are generated based on the matrix for the LDPC coding.

10. The reception apparatus according to claim 7, wherein the encoded bits are generated based on an equation that the matrix for the LDPC coding multiplied by a second matrix equals to 0.

11. The reception apparatus according to claim 7, wherein whether the first matrix for the LDPC coding is generated based on the first generation method or the second matrix for the LDPC coding is generated based on the second generation method is based on information in a PDCCH.

12. A method for a reception apparatus, the method comprising:
decoding encoded bits into one or more code block(s) with a first size, which a Low Density Parity Check (LDPC) coding is applied to, and
outputting a transport block with a Cyclic Redundancy Check (CRC), wherein
the transport block with the CRC is segmented into the one or more code block(s) in a case that a second size of the transport block with the CRC is larger than a third size,
the third size is given based on a generation method for a matrix for the LDPC coding,
the third size is a first value in a case that a first matrix for the LDPC coding is generated based on a first generation method, and
the third size is a second value which is different from the first value in a case that a second matrix for the LDPC coding is generated based on a second generation method.

* * * * *